US011025913B2

(12) United States Patent
Holland et al.

(10) Patent No.: US 11,025,913 B2
(45) Date of Patent: Jun. 1, 2021

(54) ENCODING VIDEO USING PALETTE PREDICTION AND INTRA-BLOCK COPY

(71) Applicant: INTEL CORPORATION, Santa Clara, CA (US)

(72) Inventors: James M. Holland, Folsom, CA (US); Srinivasan Embar Raghukrishnan, Folsom, CA (US); Dmitry E. Ryzhov, Mountain View, CA (US); Lidong Xu, Beijing (CN); Satya N. Yedidi, Roseville, CA (US); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/400,882

(22) Filed: May 1, 2019

(65) Prior Publication Data

US 2019/0261001 A1    Aug. 22, 2019

Related U.S. Application Data

(60) Provisional application No. 62/812,910, filed on Mar. 1, 2019.

(51) Int. Cl.
*H04N 19/176* (2014.01)
*H04N 19/147* (2014.01)
*H04N 19/567* (2014.01)
*H04N 19/124* (2014.01)
*H04N 19/105* (2014.01)

(52) U.S. Cl.
CPC ......... *H04N 19/147* (2014.11); *H04N 19/105* (2014.11); *H04N 19/124* (2014.11); *H04N 19/176* (2014.11); *H04N 19/567* (2014.11)

(58) Field of Classification Search
None
See application file for complete search history.

(56) References Cited

U.S. PATENT DOCUMENTS

| 6,097,832 A | 8/2000 | Guillotel et al. |
| 6,876,702 B1 | 4/2005 | Hui et al. |
| 6,968,008 B1 | 11/2005 | Ribas-Corbera et al. |

(Continued)

OTHER PUBLICATIONS

Masoumi et al.;: "Performance of HEVC Discrete Cosine and Sine Transforms of GPU Using CUDA" Published in: 2017 IEEE 4th International Conference on Knowledge-Based Engineering and Innovation (KBEI), Dec. 2017, Tehran Iran.

(Continued)

*Primary Examiner* — Shadan E Haghani
(74) *Attorney, Agent, or Firm* — Hanley, Flight & Zimmerman, LLC

(57) ABSTRACT

A system for video encoding is described herein. The system includes a processor to execute a multi-pass palette search and mapping on a video frame to generate palette candidates. The processor is to execute an intra block copy prediction on the video frame to generate intra-block-copy candidates. The processor is to also calculate a rate distortion optimization (RDO) cost for a set of generated residuals, the palette candidates, and the intra-block-copy candidates. The processor is to further also execute a final mode decision based on a comparison of the rate distortion optimization (RDO) costs.

23 Claims, 7 Drawing Sheets

(56) References Cited

U.S. PATENT DOCUMENTS

| | | | |
|---|---|---|---|
| 6,981,119 B1 | 12/2005 | Lepak et al. | |
| 7,333,037 B2 * | 2/2008 | Cheng | H03M 7/425 341/106 |
| 7,551,673 B1 | 6/2009 | Oh et al. | |
| 7,656,561 B2 | 2/2010 | Molgaard et al. | |
| 8,149,915 B1 | 4/2012 | Novotny et al. | |
| 8,934,544 B1 | 1/2015 | Wang | |
| 8,977,066 B2 * | 3/2015 | Alakuijala | H04N 19/463 382/166 |
| 9,330,060 B1 | 5/2016 | Tsang | |
| 9,398,297 B2 | 7/2016 | Gupta | |
| 9,438,923 B2 | 9/2016 | He et al. | |
| 10,009,615 B2 * | 6/2018 | Gisquet | H04N 19/52 |
| 10,068,309 B2 | 9/2018 | Fries et al. | |
| 10,165,292 B2 * | 12/2018 | Wu | H04N 19/436 |
| 2001/0021303 A1 | 9/2001 | Bruls et al. | |
| 2003/0091114 A1 | 5/2003 | Vissers et al. | |
| 2003/0229719 A1 | 12/2003 | Iwata et al. | |
| 2004/0111627 A1 | 6/2004 | Evans et al. | |
| 2005/0276496 A1 | 12/2005 | Molgaard et al. | |
| 2007/0110160 A1 | 5/2007 | Wang et al. | |
| 2011/0058606 A1 | 3/2011 | Dencher | |
| 2012/0219064 A1 | 8/2012 | Zheng et al. | |
| 2013/0163671 A1 | 6/2013 | Korman et al. | |
| 2013/0184007 A1 | 7/2013 | Hategan et al. | |
| 2013/0208796 A1 * | 8/2013 | Amitay | H04N 19/53 375/240.16 |
| 2013/0266072 A1 | 10/2013 | Lee et al. | |
| 2014/0126638 A1 | 5/2014 | Seivers | |
| 2014/0205012 A1 | 7/2014 | Lee et al. | |
| 2014/0286433 A1 | 9/2014 | He et al. | |
| 2015/0178077 A1 | 6/2015 | Srinivasan et al. | |
| 2015/0264348 A1 | 9/2015 | Zou et al. | |
| 2015/0276496 A1 | 10/2015 | Kellogg et al. | |
| 2015/0279055 A1 | 10/2015 | Kaburlasos et al. | |
| 2016/0029028 A1 * | 1/2016 | Pu | H04N 19/93 375/240.24 |
| 2016/0073107 A1 | 3/2016 | Moon et al. | |
| 2016/0225161 A1 | 8/2016 | Hepper | |
| 2016/0269747 A1 | 9/2016 | Duenas et al. | |
| 2016/0283391 A1 | 9/2016 | Nilsson et al. | |
| 2016/0316214 A1 * | 10/2016 | Gisquet | H04N 19/94 |
| 2016/0353122 A1 | 12/2016 | Krajcevski et al. | |
| 2016/0373741 A1 | 12/2016 | Zhoa et al. | |
| 2017/0076419 A1 | 3/2017 | Fries et al. | |
| 2017/0094274 A1 | 3/2017 | Chien et al. | |
| 2017/0178594 A1 | 6/2017 | Hasselgren et al. | |
| 2017/0256024 A1 | 9/2017 | Abraham et al. | |
| 2017/0345121 A1 | 11/2017 | Seiler | |
| 2018/0041766 A1 | 2/2018 | Holland et al. | |
| 2018/0041770 A1 | 2/2018 | Holland et al. | |
| 2018/0063553 A1 | 3/2018 | Zhang et al. | |
| 2019/0037227 A1 | 1/2019 | Holland et al. | |
| 2019/0110045 A1 | 4/2019 | Zhao et al. | |
| 2019/0260989 A1 | 8/2019 | Racape et al. | |

OTHER PUBLICATIONS

Lin et al.,: "Efficient Algorithm for H.264/AVC Intra Frame Coding", Published in: IEEE Transactions on Circuits and Systems for Video Technology ( vol. 20 , Issue: 10 , Oct. 2010) 1367-1372.

Sarwer et al.,: "Complexity Reduced Mode Selection of H.264/AVC Intra Coding", Published in: 2008 International Conference on Audio, Language and Image Processing, Jul. 2008, Shanghai, China.

* cited by examiner

ENCODING VIDEO USING PALETTE PREDICTION AND INTRA-BLOCK COPY

CROSS-REFERENCE TO RELATED APPLICATION

The present application claims the benefit of U.S. Provisional Patent Application Ser. No. 62/812,910 by Holland, et al., which is titled "ENCODING VIDEO USING PALETTE PREDICTION AND INTRA-BLOCK COPY" and was filed Mar. 1, 2019, the disclosure of which is incorporated herein by this reference as though fully set forth herein.

BACKGROUND ART

A video stream may be encoded into a variety of video compression formats, or the characteristics of the stream may be changed. Characteristics of the video stream include, but are not limited to, the resolution and the bit rate of the video stream. Encoding may also be used when preparing the video stream for transmission between devices or components of computing devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
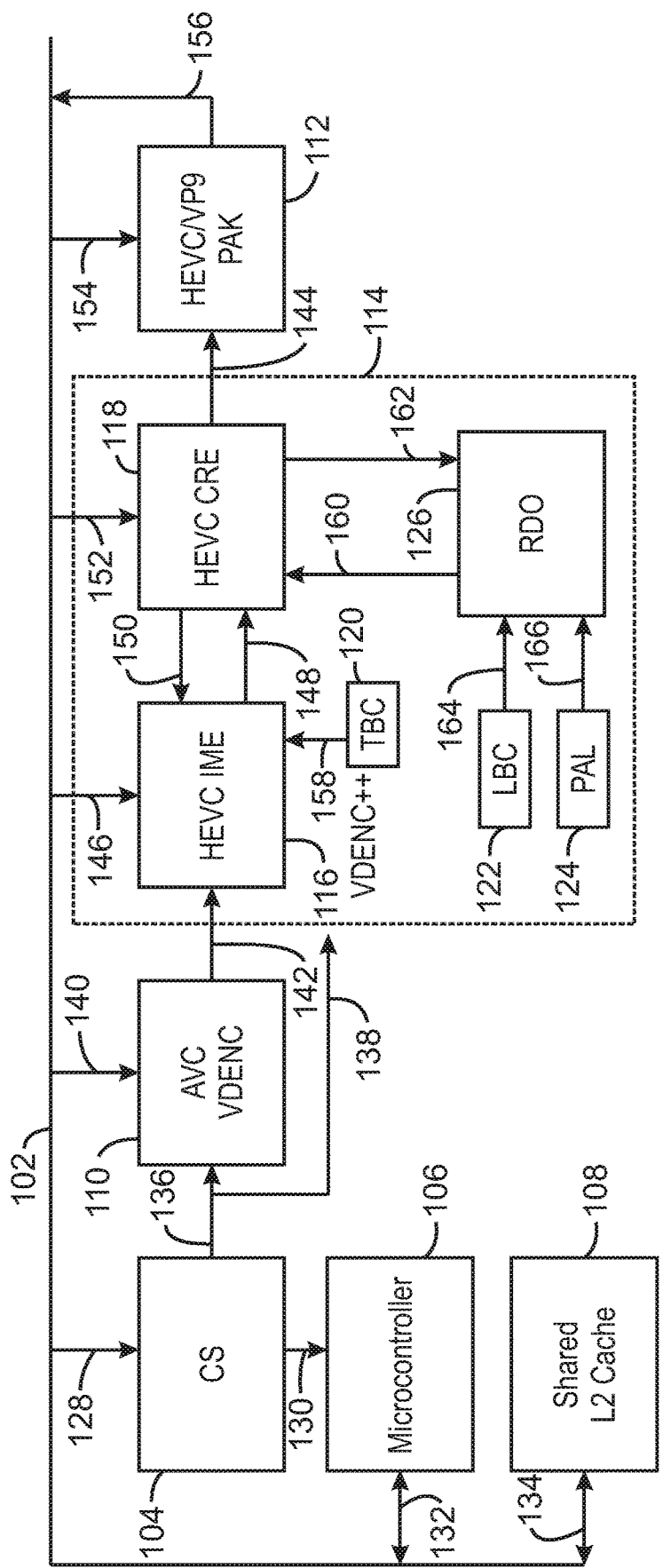
FIG. 1 a block diagram illustrating an example system for encoding video using multi-pass palette prediction and intra-block copy.

Some systems for encoding video may employ multiple programmable engines running kernel programs that use hardware co-processors. In addition, video may also be encoded using hardware-based Advanced Video Coding (AVC)-class encoders or High Efficiency Video Coding (HEVC)-class encoders. For example, AVC-class encoders may encode video according to the ISO/IEC 14496-10-MPEG-4 Part 10, Advanced Video Coding Specification, published May 2003. HEVC-class encoders may encode video according to the HEVC/H.265 specification version 4, which was approved as an ITU-T standard on Dec. 22, 2016. However, existing hardware AVC-class or HEVC-class encoders may either exclude or reduce the importance of rate distortion optimization for screen content for various reasons. Screen content, as used herein, refers to digitally generated pixels present in video. Pixels generated digitally, in contrast with pixels captured by an imager or camera, may have different properties not considered AVC and HEVC. The ITU-T version of the HEVC standard that added SCC extensions, published in March 2017, addresses large gaps exposed by previous standards. All wireless display, remote graphics, video game broadcasting applications may experience performance gains with SCC over HEVC with combined format range extensions (REXT) version 6 as published Oct. 1, 2014. SCC is specifically focused on screen content with special focus on text quality. Text may be very challenging to encode with existing tools found in AVC and HEVC because it has very high frequencies. SCC adds new tools to compress text with less bits and higher quality. In particular, the SCC adds an intra block copying tool and a palette mode tool. However, although the standards provide for decoding techniques, the specifications may not include techniques for encoding screen content efficiently.

The present techniques include techniques for improving the performance, quality, and extensibility of hardware video encoders. In embodiments, the present techniques improve an encoder that is without programmable engines executing the main loop of the encoder algorithms, so-called fixed function encoding. Fixed function encoding may be used, for example, in phones, tablets, computers, cameras, cars, game systems, and so on to perform a host of encoding tasks for real-time compression of pixels for any number of reasons. The present techniques include, but are not limited to, the following algorithms and techniques. First, a multi-pass palette search and mapping technique is provided. Second, techniques for intra block copy prediction are also provided. Prediction may include finding predictors that are guesses as to where to search around or nearby. The intra block copy techniques include left block copy (LBC) and top block copy (TBC) techniques. Finally, techniques for combining the two-pass palette search and mapping, and the intra block copy prediction, with traditional temporal inter and spatial intra candidates in a rate distortion optimized mode decision are provided. The candidates are potential encodings of a given block.

The techniques described herein thus enable High Efficiency Video Coding (HEVC)-class video encoding to be implemented using hardware that efficiently encodes screen content. For example, the techniques describe herein may be used to encode video according to the second version of the HEVC standard, published May 2015, or version 0.6 of the VP9 Bitstream and Decoding Process Specification, published Mar. 31, 2016. Previous standards treated "macroblocks" as statically sized elements, while in newer tree recursive codecs, the encoder can evaluate when a pixel block should be split into finer "coding units" (CUs) or be made into larger CUs depending on many factors ultimately yielding the lowest bit cost with the highest visual quality. Additionally, previous standards treated each macroblock with a uniform prediction type (such as inter or intra prediction types) and uniform transform size (such as 8×8 or 4×4) while high efficiency standards allow for mixing of prediction types and mixing of transform sizes, both based on the encoder decision process. By contrast, the coding units of the present techniques are dynamically sized and may include any combination of different prediction types. Thus, the rate distortion optimization of HEVC-class encoding with screen content improvements may be used to achieve significant compression gains over AVC-class encoders, including software or hardware based encoders, as well as HEVC-class encoders. Such a hardware implementation may provide better power and performance over software-based solutions. The techniques thus enable real-time HD and 4K encoding on devices with limited processing capabilities, such as mobile devices. Moreover, the techniques may provide compatibility with multiple recursive-based codecs and multiple formats using a singular engine.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

FIG. 1 a block diagram illustrating an example system for hardware video encoding using a three stage motion estimation. The example system 100 can be implemented in the electronic device 600 of FIG. 6 below. For example, the system 100 may be implemented using the encoder 628 and microcontroller 652 of the electronic device 600.

The system 100 includes a memory/cache interface 102 that is communicatively coupled to a command streamer (CS) 104, a microcontroller 106, a shared L2 cache 108, a video encoder AVC VDENC 110, an HEVC/VP9 hardware bit packer (PAK) 112, and an enhanced video encoder VDENC++ 114. The enhanced video encoder VDENC++ 114 further includes an HEVC integer motion estimator 116 and an HEVC check and refinement engine (CRE) 118. The enhanced video encoder VDENC++ 114 further also includes a top block copy unit (TBC) 120, a left block copy unit (LBC) 122, a palette prediction unit (PAL) 124, and a rate distortion optimization unit (RDO) 126.

As shown in FIG. 1, the CS 104 may receive a set of commands 128 from the memory/cache interface 102 and send information 130 to the microcontroller 106. For example, the CS 104 may be a buffer in memory that software running on the host CPU or microcontroller can use to inject command buffers to the hardware fixed function. For example, a host may advance a head pointer, while the hardware consumes the commands and advances the tail pointer. The hardware cannot advance the tail pointer beyond the head pointer and the software cannot advance the head pointer beyond the tail pointer. In some examples, the information 130 may include commands used to control whether a second pass is to be executed or not based on rate control analysis. For example, as the CS 104 is the unit in charge of dispatching jobs, the CS 104 may dispatch the job again based on microcontroller stats, before proceeding to next job. The microcontroller 106 may send and receive information 132 to and from the memory cache interface 102. For example, the information 132 may include statistics such as microcontroller statistics, video encoder statistics, PAK statistics, and conditional pass flag statistics. The shared L2 cache 108 may also send and receive information 134 to and from the memory/cache interface 102. For example, the information 134 may include shared pixels between video encoder 114 and the PAK 112. For example, if the video encoder 114 load a given block of pixel data, then PAK 112 may not have to load the block of pixel data from memory when it comes time to perform a PAK on a given LCU\CU, etc. The PAK 112 may access the particular block of pixel data from the shared L2 cache 108 instead of a slower memory. The CS 104 may send a state 136 to the video encoder 110 and a state 138 to the enhanced video encoder 114. For example, the states 136 and 138 may be control information, such as frame or tile type, target QP, various enables or disables based on application controls, etc. In some examples, state 138 may also include source pixels.

The video encoder 110 may also receive video 140 from the memory/cache interface 102 in addition to the state 136. For example, video or other sequences of visual images may be presented as a series of frames or tiles or sets of pixels. As used herein, a tile refers to a mosaic pattern that fills a whole frame. A frame may thus be composed of many tiles potentially. Each individual tile can be repeated before proceeding to the next tile to increase efficiency in scenarios where a scene change may have occurred. For example, rather than waiting for a whole frame to be improperly encoded on scene changes, at the completion of the first tile the encoder can repeat just that one tile and update the future tiles to be aware the scene change occurred. If there are 4 tiles per frame, this may take 1.25× the time of 1 frame whereas frame based repetition may take 2×, assuming the first tile detected the misprediction and the process was repeated.

In some examples, each tile can be decoded independently. For example, in HD vs UHD resolutions, of 1920×1080 or 3840×2160 up to 7680×4320, respectively, without the use of tiles, a decoder may have to decode 7680 pixels wide before advancing to the next row of LCUs. This may put pressure on the decoder to hold a large amount of temporary information that could be referenced by the next row. In some examples, the frame can be split into 8 tiles, each 1920 wide and still 4320 tall. For example, the decoder can decode the frame like a newspaper column strip before moving to the next column. Tiles can also be used to reduce the height of a frame as well. If a tile is 1920×1080 in size, a 7680×4320 frame may include 4×4 tiles (4×1920 by 4×1080=7680×4320). However, in some examples, the tile size can also be set to the frame size, resulting in 1×1 tiles. The video encoder 110 can perform two stages of motion estimation. Motion estimation can be used to exploit the redundancy between adjacent frames or tiles to achieve compression by selecting a frame or tile as a reference frame or tile and predicting subsequent frames or tiles from the reference frame or tile. The prediction may be described by a plurality of motion vectors. In particular, the video encoder 110 may perform a hierarchical motion estimation search and an integer motion estimation search on the received frames or tiles. In motion estimation, the current frame or tile in a sequence of frames or tiles is predicted, usually from at least one reference frame or tile. In some examples, the movement of objects in a sequence of frames or tiles can be analyzed to obtain vectors that represent the estimated motion of the objects between frames or tiles. In some examples, each frame or tile can be divided into coding units (CUs), and the motion vectors represent the change in position of a CU between frames or tiles. A CU may be an adjustable block of pixels. For example, a CU may be a block of pixels sixteen by eight pixels in size.

A current frame or tile may thus be divided into CUs such that each CU is compared to a region in the reference frame or tile of the same size using an error measure, and the best matching region is selected. The search is conducted over a search area. A motion vector denoting the displacement of the region in the reference frame or tile with respect to the CU in the current frame or tile is determined. In some examples, the video encoder 110 can use multiple reference frames or tiles as downscaled references which are searched to provide candidates for a full resolution IME search. For example, the IME may be performed to find a temporal match. Moreover, motion estimation of subsequent blocks can be made prior to a complete mode decision being made on a previous block. Such a motion estimation is made as a heuristic of an approximate or pseudo prediction, which may violate the precise decoder specification but may be close enough for the encoder and encoding decisions in the majority of CUs. The prediction mode may also determine the number of passes made to compress the current frame or tile size into a target frame or tile size. The video encoder 110 may then output one or more search centers 142 to be refined by the enhanced video encoder 114 and used to generate PAK coding unit (CU) objects 134 sent to the HEVC/VP9 PAK 112 for encoding the video frame. Thus, the VDENC++ 114 can be included in a system to enable HEVC/VP9 class hardware encoding of video.

The enhanced video encoder VDENC++ 114 may include a third stage of motion estimation, the HEVC IME 116. As described in greater detail below with respect to FIG. 2, the HEVC IME 116 can generate shape candidates 148 and receive predicted motion vectors 150 from the HEVC CRE 118. The HEVC CRE 118 can perform a number of functions. For example, the HEVC CRE 118 can perform skip checks, fractional motion estimation, bi-directional motion estimation, intra-frame angular prediction, and mode decision making. A skip check may be a spot check of a specific location of a previous frame or tile to see how well the specific location matches a predicted motion vector. The skip check may be used to determine when encoding for a CU should be skipped, such that no vector information for a given CU is generated. The skip check is confirmed when the current CU follows the same motion pattern as the neighboring CUs, whether they are static or following a translation motion. In the case of a skip, no information may be generated for the associated CU.

In some examples, the HEVC CRE 118 can perform a fractional motion estimation (FME) based on the image frame or tile and/or partition information. For example, selected CU candidates with their motion vectors can be further searched in the fractional motion resolution. After partitioning, the resulting motion vectors may be at an integer resolution. For example, the motion vectors for each CU shape may be per pixel. Various coding specifications may specify resolutions halfway between pixels or even quarter resolutions between pixels to be more precise. For example, an object moving from frame to frame or tile to tile may not move a whole pixel between the two frames or tiles. Instead, the object may move only half a pixel. Thus, a half fractional resolution may enable such a motion to be captured. In some examples, the motion vectors can be encoded and stored or transmitted to a decoder.

In some examples, the HEVC CRE 118 can perform bidirectional motion estimation. For example, the HEVC CRE 118 may locate an object in both future and past frames or tiles and blend the two of them together to average the predicted results. Thus, the resulting predicted motion vectors may be more accurate than either a motion vector predicted solely on a past frame or tile or a motion vector predicted solely on a future frame or tile. In some examples, the frames or tiles can be re-ordered differently from the display order. For example, if a display order for 5 frames is 0,1,2,3,4, then the frames can be encoded in the order 0,2,1,4,3 (or IPBPB in this example). Frames 1 and 3 can predict from the past (0) and the future (2). Such a reordering may produce better compression.

In some examples, the HEVC CRE 118 can perform intra-frame or intra-tile prediction. For example, a scene change or other major change may have occurred such that the object does not exist in any past frame. Thus, the motion vectors must be predicted entirely from pixels from within the frame. The HEVC CRE 118 can analyze pixels above and to the left of each pixel, and select an angle in which the pixels can be copied. For example, horizontal patterns may be copied horizontally and vertical patterns may be copied vertically. In some examples, there may be a number of predetermined angles between the horizontal and vertical axes to select from. For example, a higher performance mode may include searching with less IME predictor candidates. In some examples, normal performance may be a balance of quality and execution time of given frame. A higher performance mode may reduce the execution time at the cost of some quality. A lower performance mode may increase the quality while also increasing the execution time. In some examples, the HEVC CRE 118 can check all 35 angles in both normal and lower performance modes (providing higher quality), but may reduce the angles searched in higher performance (lower quality) for some CU levels. For example, the HEVC CRE 118 can reduce the angles for 32×32 CU only, and not 16×16 or 8×8, and continue to search all angles there.

In some examples, for the IME search, a normal performance mode of the HEVC IME 116 may use 8 candidates. In a high performance mode, the HEVC IME 116 may use only 4 candidates for the IME search to save time by performing less calculations. In a higher quality or lower performance mode, the HEVC IME 116 may search 12 candidates for the IME search. In various examples, the HEVC IME 116 can also perform TBC IME candidate searches.

In some examples, for the HME search, in a normal performance mode, the AVC video encoder 110 may only consider one reference frame. In a higher quality mode, the AVC video encoder 110 may consider more than one reference frame.

In some examples, support may be provided for multiple codecs, including the VP9 codec in particular. For example, HEVC and VP9 are different in the skip and collocated motion vector (MV) list. For example, only the nearest neighbor is considered for VP9. Since VP9 also uses different transform and quantization methods, the RDO computation described below may need to consider 0-255 quantization steps. Furthermore, a different transform matrix may be used. In addition, a bit rate estimation may be based on probability. Neighbor pixels smoothing may also be disabled for VP9. Additionally, a MPM list derivation, mode mask, partition mask, may be provided for VP9 support. In some examples, intra true motion support may also be included for 4×4, 8×8, 16×16, 32×32 and non-square shapes. Non square intra prediction may also be provided for 16×8/8×16, 32×16/16×32, 8×4/4×8 shapes. Furthermore, reference frame size scaling may be provided on the fly when executing motion searches.

The type of prediction made for each frame may be referred to as a mode decision. For example, the HEVC CRE 118 can determine whether to encode frames based on any of the various types of prediction, including skip checks, fractional motion estimation, bi-directional motion estimation, intra-frame motion estimation, left block copy, and palette prediction. In some examples, the HEVC CRE 118 can include adaptive channel detection for intra, IBC, and palette decisions. To determine the particular encoding mode, the HEVC CRE 118 can make a mode decision based on motion estimation. In particular, the output of motion estimation may be used to determine an encoding cost of each different modes that might be applied to encode the current image frame. This may result in selection of the mode that exhibits least cost in one implementation. In some examples, the HEVC CRE 118 may choose a mode that is a closest match to the original image and consumes the least amount of bits to transmit in the bit stream. For example, the four modes of prediction may result in a closely matching image, but one of the prediction modes may consume less bits than the rest. The HEVC CRE 118 may thus select the prediction mode resulting in less bits. In some examples, the HEVC CRE 118 may base the mode decision on a rate distortion optimized (RDO) cost received from the RDO 126, as indicated by an arrow 160. For example, the RDO cost may be calculated by a forward transform and quantization (FTQ) module (not shown) of the RDO 126 based on candidates received from the CRE 118, as indicated by an arrow 162. In various examples, IBC and Palette candidates included in CU-based RDO decision tree. In some examples, an FTQ module (not shown) may calculate the RDO cost using a discrete cosine transformation (DCT) and a quantization. The FTQ module may also estimate the amount of bits used to transmit a block based on an amount of error to correct. The RDO 126 can send the RDO costs 164 for various mode decisions to the CRE 118, as indicated by an arrow. The RDO 126 can also receive data 166 from the CRE 118 for calculating RDO costs, as indicated by an arrow. The data 166 can include a bit cost estimate, instructions, and predicted pixels. For example, the data in 166 can include the syntax describing the new palette colors, index map, combined estimated bit cost for each, along with the error metric comparing the palette predicted block versus the source block.

In various examples, an intra block copy unit (not shown) may include a TBC 120 and an LBC 122. The TBC 120 is an HME unit that feeds the IME 116 predictors, as indicated by an arrow 158. For example, the TBC 120 can select a region of pixels above current block and downscale the selected region along with source block. The TBC 120 can then perform an exhaustive search identifying best block vector candidates in different shape arrangements. For example, the shape arrangements can include square, rectangle pairs, and square quads, among other shape arrangements. In some examples, the TBC 120 can then send the best block vector candidates at full resolution for including in the integer motion estimation of the HEVC IME 116.

In some examples, the LBC 122 is a one dimensional IME unit that performs a full resolution one dimensional search along the x-axis of previously encoded pixels for increased performance. The LBC 122 operates in parallel with the IME 116. For example, the LBC 122 may perform the one dimensional search by comparing a current block with pixels to the left of the current block. In various examples, the LBC 122 can omit or include nearby blocks based on performance and quality factors. For example, the LBC 122 can exclude near blocks to improve performance by reducing feedback dependency. The LBC 122 sends candidates to the RDO for RDO cost calculation. IN some examples, LBC 122 and TBC 120 IME records are merged and sent to the RDO 126. The merged records can use available RDO cycles and compete as the best IBC candidate at the CU level.

The PAL 124 is an intra block compression that may be executed in parallel with other intra prediction techniques. In some examples, the PAL 124 is a multi-pass algorithm that can perform a palette search in a first pass and a mapping in a second pass. In various examples, a palette scan, bit cost calculation, and SSE are all generated within the PAL 124 because no transform is performed in palette prediction. An example multi-pass algorithm that may be used by the PAL 124 is described in greater detail with respect to FIG. 2.

In some examples, the HEVC CRE 118 can compare different combinations of coding units based on their combined RDO costs as determined by the RDO 126. For example, a 16×16 coding unit may be compared to any combination of four 8×8 coding units. Likewise, differently estimated 32×32 coding units may be compared with different combinations of 4×4 coding units. Similarly, a 64×64 coding unit may be compared with various combinations of four 32×32 coding units. The HEVC CRE 118 can then make a final decision as to which coding units or largest coding units to send to the PAK 112.

The prediction mode selected may also determine the number of passes made to compress the current frame size into a target frame size. In some examples, the target frame size may be determined by an application or driver. In some cases, several passes are made to determine if the current frame size is equal to the target frame size, wherein a pass is a single iteration through a portion of the encoder that is used to achieve the target frame size. The target frame size may be specified by a rate control module (not shown). In some examples, the number of passes to bring the current frame to the size of the target frame is limited by the mode for each frame. With each pass, a quantization parameter may be modified to achieve the target frame size. The mode decisions selected by the CRE 118 are sent to the PAK 122, as shown by an arrow 144.

The PAK 112 can encode the video based on the received mode decisions and generate a statistics stream 156. The statistics stream can include various parameters that are gathered during encoding and can be returned to memory for use by another process or to tune the encoder further for better compression or quality. For example, the statistics from the PAK 112 may include the actual bit amount of bits used to transmit a CU. In some examples, the statistics stream 156 may include sum of square error (SSE) classifier cubes. For example, a final accurate SSE between the source and decoded picture can be generated in the PAK 112 and classified into various groups for faster software analysis by the microcontroller 106. In some examples, this binning can be performed by marking low and high thresholds of the SSE based on motion vector length of inter CUs or intra distortion, and specific regions-of-interest in the frame. In some examples, the microcontroller 106 may have a frame re-encoded in response to detecting an error beyond a threshold. In some examples, the microcontroller 106 may specify an adjustment value for a prediction parameter for future frames to be encoded with less error in response to detecting an error below a higher threshold but greater than a lower threshold. In some examples, an application can specify an adjustment value for tuning the thresholds. For examples, some applications may be more tolerant while some other applications may be stricter. In this way, the thresholds may be tuned to support more usages than if the thresholds were set at static values.

In addition, the PAK 112 can generate reconstructed video frames to be used for motion estimation. The reconstructed frames can be saved to memory, such as the shared L2 cache 108. In some examples, the 10 bit or 12 bit input can be truncated to the 8 most significant bits (MSB) in the source and the reconstructed image can be written to the memory 108 in a split format sending the 8 bit MSB to one region of memory 108 with the 2 bit or 4 bit of least significant bits (LSB) to another region of memory 108. This allows the motion estimation to use only the 8b MSB for searching while the 10b and 12b original values can be used in the motion compensation of the PAK 112, substantially reducing bandwidth and increase quality on noisy content.

As illustrated, the PAK 112 receives 154 and transmits 156 data to/from the memory/cache interface 102. In some examples, the shared L2 cache 108 may be a shared cache between the encoding process performed by AVC VDENC 110 and VDENC++ 114, and the PAK 112. Video encoding may include both motion estimation and motion compensation. Motion estimation is the process of searching for a best motion vector. Motion compensation is the process of taking a specified motion vector and then predicting pixels at the location of the motion vector that can then be used for encoding. Each of the encoding components 110, 116, 118, and 112 may receive pixels to be processed as indicated by arrows 140 146, 152, and 154, respectively. Specifically, the encoding process loads pixels for searching and determining the motion vectors, and the PAK 112 processes pixels to apply motion to the location specified by the motion vectors. The shared L2 cache 108 is a common cache that the processes can access to read/write data. Thus, in some examples, when data is first loaded for encoding, those pixels remain in the shared L2 cache 108 long enough for the PAK process 112 to find each specific pixel needed for motion compensation. In some examples, this shared L2 cache 108 thus prevents loading and transmitting the pixels twice. In some examples, the shared L2 cache 108 may include variable register transfer logic (RTL) cache capacity declaration pairing with column tile width walking patterns. In some examples, where memory bandwidth must be minimized and an on-chip cache must be minimally sized, a tile-width cache can be used instead of a frame-width cache.

FIG. 1 does not show various costings that can be applied to each decision made by the AVC VDENC 110, the HEVC IME 116, and the HEVC CRE 118. A software driver may have information that is used to override any of the functions described above through costings. Moreover, the microcontroller 106 may also have information that is used to override any of the functions described above through costings. In some examples, the costings may be weights and controls that are used to essentially bias decisions throughout the process. For example, in the HEVC CRE 118 various candidate motion estimations may be compared with skip candidates. In some cases, the raw numbers that are derived and used for the comparison may result in a coding unit that would not be selected when information is available that could influence the coding unit choice. In some examples, some a priori knowledge or pre-determined values may suggest if the three candidates are close, then always take the skip as the best choice. These costings result in a programmable weight from some other source. The costings can be then distributed to bias decisions and selections at each search or decision. The costings enable a high degree of programmability with each searching function, even when fixed function hardware units are used. Thus, the present techniques enable a high degree of reusability for different applications.

In some examples, the costings can be used to create a re-configurable encoding pipeline. For example, various costings and/or parameters can be used to bias the mode decisions during encoding. Parameters such as the quantization parameter (QP) can be adjusted to bias the mode selection based on different content types, available bandwidth, resolution, targeted codec and bit budgets. In embodiments, for subjective video optimization, each QP can be adjusted for each CU individually to promote quality in some cases and hide visual artifacts in regions that are less visible. Put another way, the QP as a costing enables a direct control feedback loop where by changing the QP bias up or down, the present techniques can improve how the user perceives a video quality by increasing artifacts where the user is not looking and decreasing artifacts where the user is looking. Multiple stages of user programmable thresholds can be used to control the QP. A Stage1 QP can be based on the relative distortion of this block to the rest of the frame in quartiles. Each quartile may have its own change in QP or deltaQP. A Stage2 QP can be based on mode specific information, such as the intra-prediction mode type or the motion vector length for inter-prediction. A Stage3 QP can be based on a user-specified region of interest map with multiple levels of associated deltaQPs. Each delta may be combined and clamped if necessary before and after combination with the sliceQP.

In cases where a integer QP value produces a frame that significantly exceeds a target bit budget and one QP higher integer value produces a frame that significantly undershoots the target bit budget, a fractional precision QP between the two nearest integer QP values may be used and the lower and higher integer QP values may be proportionally assigned throughout the frame so that the average of the CU QP for the entire frame allows for more accurate results to meet the target bit budget with a lesser amount of overshoot and undershoot.

In some examples, a quantization parameter is a value that is used to divide the coefficients of the current frame in order to obtain values for the target frame size. A higher quantization parameter may result in more zero coefficients that do not have to be encoded to reduce the bitrate at the expense of quality. Accordingly, the frames may be sized in such a manner that the number of bits per frame comports with the bit rate of the encoding format of the target video stream. In some cases, an encoder may perform motion estimation again to determine the finer motion vectors and CU types of the frames after the bit rate control has been applied to each frame. In some examples, an additional fourth stage can make per coding unit adjustments based on motion length. For example, a motion can be classified as static motion, low motion, or high motion. Because the human visual system may be more sensitive to artifacts on static objects than objects with high motion, the QP can be decreased in areas of static motion or low motion, and increased in areas of high motion, respectively, to blur details and enhance encoding accordingly.

Once new motion vectors, quantization parameters, and CU types have been determined, the HEVC PAK 112 may encode the frames into a final compressed video stream in the target video compression format. However, both decoding and packing can be CABAC limited quickly. The PAL 124 can count the number of bins being spent on escapes and prevent a catastrophic performance failure in a corner case where many escapes are selected at mid to low QP and palette is the ultimate PU winner. Because escapes are bypass coded, a simple LUT can be used to index the bit depth, QP, and magnitude of the escape to determine the bins. In some examples, VDENC 110 accumulates these bins per CU and prevents escape from winning if the provided threshold is exceeded. As one example, the PAK 112 processes 8 bypass bin per clock, so 400 can be sustained in a speedmode per 8×8 CU. As used herein, speedmode refers to a mode where performance is prioritized. After that budget threshold is exceeded, escapes are prevented for the remainder of the CU. A table can be used to count the number of bins based on the QP and magnitude of the escape value. The size of the table is relatively small and may be implemented as a ROM, with no memory programming needed.

In some examples, very complex run lengths that are very short can potentially result in a high number of CABAC bins. PAL 124 can count up the various lengths of each run and align them to a predetermined complexity score. For example, the PAL 124 can clock count assuming PAK runs at 8bin per clock cycle for these syntax elements. In various examples, if the PAL 124 determines both scan orders exceed this complexity score, then the palette candidate is prevented from winning. For example, given 50 clocks per 8×8 in speed mode (×4 or ×16 for 16×16 and 32×32), both scan patterns can be tested. If one of the scan patterns exceeds the performance budget and the speedmode is enabled, then the PAL 124 can eliminate that scan pattern. In some examples, if both scans fail, then the palette mode is blocked.

The diagram of FIG. 1 is not intended to indicate that the example system 100 is to include all of the components shown in FIG. 1. Rather, the example system 100 can be implemented using fewer or additional components not illustrated in FIG. 1 (e.g., additional motion estimators, feedback loops, microcontrollers, passes, etc.). For example, the VDENC++ may also include separate modules for FTQ and a final decision module (not shown) separate from the HEVC CRE 118 to make final decisions regarding units.

Figure 2:
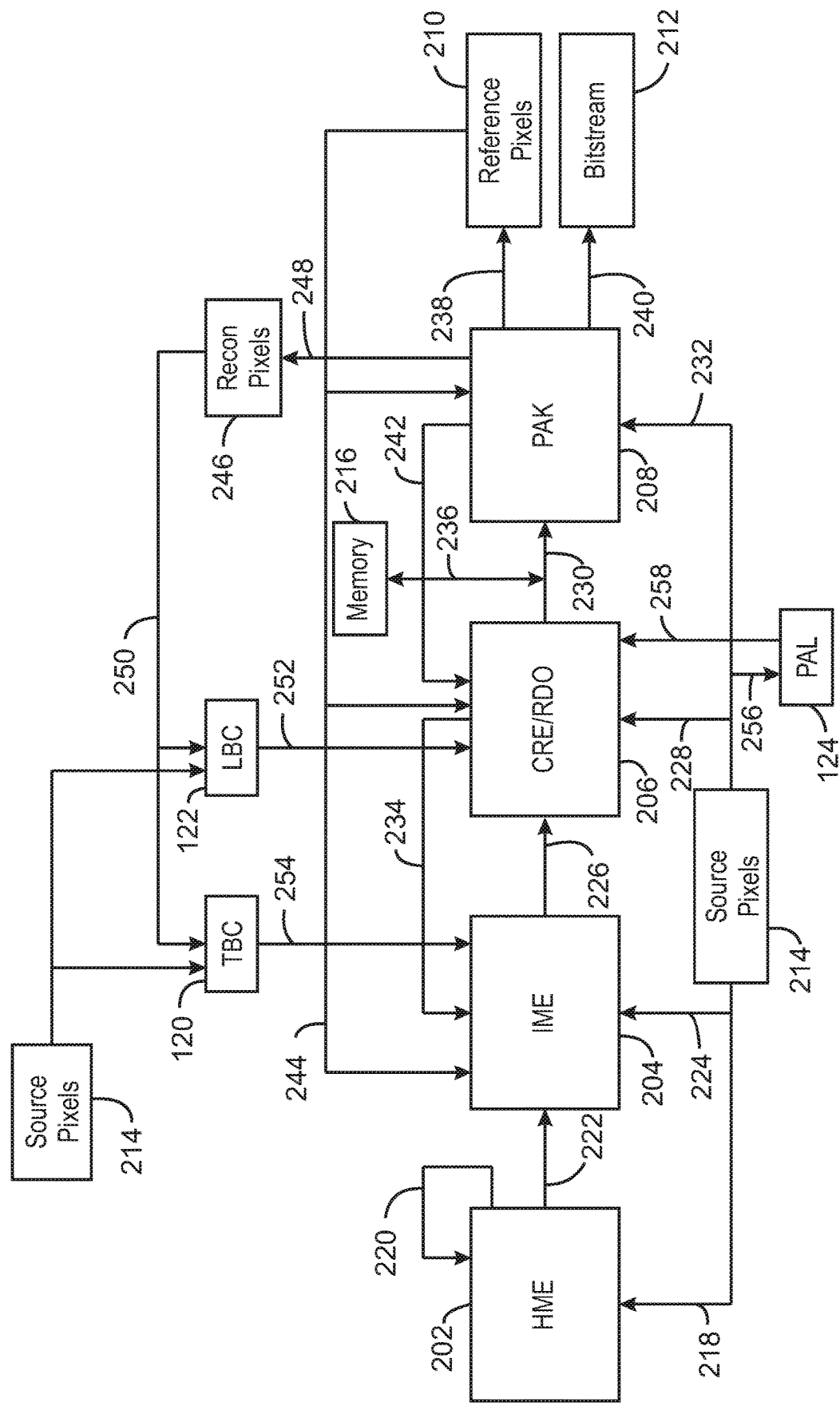
FIG. 2 is a block diagram illustrating an example pipeline for encoding video using palette prediction and intra-block copy.

FIG. 2 is a block diagram illustrating an example pipeline for hardware video encoding. The example pipeline 200 can be implemented in the system 100 of FIG. 1 above, or the electronic device 600 below in FIG. 6 using the method 300 of FIG. 3 below. The pipeline 200 includes multiple stages including a hierarchical motion estimation (HME) search stage 202, an integer motion estimation (IME) search stage 204, a check and refinement engine (CRE) stage 206, and a hardware bit packing (PAK) stage 208. For example, the HME search stage 202 may be implemented via the video encoder AVC VDENC 110, the IME search stage 204 may be implemented via the HEVC IME 116, the CRE stage 206 may be implemented via the HEVC CRE 118, and the PAK stage 208 may be implemented via the HEVC/VP9 PAK 112 of FIG. 1 above. The output of the PAK stage 208 may be reference pixels 210 and a bit stream 212. In addition, FIG. 2 includes a set of source pixels 214 shown being received at the HME 202, the IME 204, the CRE 206, the PAK 208, and a palette prediction unit (PAL) 124. The PAL 124 is communicatively coupled to the CRE 206. The pipeline 200 includes memory 216 communicatively coupled to the CRE 206. The pipeline 200 includes also includes a top block copy unit (TBC) 120 communicatively coupled to the IME 104 and the PAK 108. The pipeline 200 further includes a left block copy unit (LBC) 122 communicatively coupled to the CRE 206 and the PAK 208. The TBC 120 and LBC 122 may also be referred together as intra block copy (IBC).

A hierarchical motion estimation (HME) search 202 may be performed to obtain multiple references. In various examples, the HME 202 may be performed on each subsequent frame in order to determine the motion vectors for each frame. An HME search 202 involves performing coarse searches for motion vectors for each frame to determine an estimated motion vector for each CU within the frame based on a previous frame. For example, when a first I-frame is analyzed, no HME search may be performed as there is no previous frame. At that time, the source pixels 214 may be downscaled so that way when the next frame is encoded, the downsampled pixels 220 may become the reference that is compared to the source 216 for motion estimation. The reference 220 may thus be used from the third frame onward. Thus, the source pixels 216 may be internally downsampled by the HME 202 and written and read back as indicted by feedback loop 220 for future use as a downsampled reference. The initial estimated motion vectors may be refined by performing additional searches at a finer level of granularity. For example, the CUs may be searched at various resolutions, from coarse to fine levels of granularity, in order to determine the motion vectors. Other HME searching techniques may include, but are not limited to, changing the size of the CUs when searching for motion vectors.

In various examples, bit rate control may be applied to each frame in order to create frames that meet the frame size of the encoding format of the target video stream. For example, the various video compression formats use a stated bit rate for a video stream, and the bit rate is the number of bits per second that are present when the video is played. In some examples, bit rate control may be performed by determining the ideal quantization parameters for the frame to result in the target frame size.

In some examples, the HME search stage 202 may take as input a full resolution CU and scale down the resolution to a fourth, an eighth, or higher resolution. The HME motion estimation can then be performed with the scaled down resolution. For example, the full resolution of the input CUs may be 64×64 pixels, and the scaled down resolutions may be 32×32, 16×16, and 8×8 pixels. This results in a performance advantage when compared to performing the HME search 202 at full resolution, which may be very power performance intensive. In some examples, the HME search 202 can be performed using two references. For example, the two references may be the two frames that immediately precede a current frame. In other embodiments, the two references may be a previous frame and a long term reference frame. As used herein, a long term reference frame is a high quality encoded frame that was processed within a predetermined number of frames ago. For example, the long term reference may be a very good quality encoded frame from 100 frames ago. In some examples, a predetermined number of candidates may be considered for motion estimation. For example, the number of candidates may be set at sixteen candidates. In some examples, the HME search 202 may include two stages. For example, the first HME stage may be more downscaled than the second HME stage. The second HME stage may receive predictors from the first HME stage. In this way, the number of stages may be increased to reduce lost details due to larger downscaling using less stages. The output of the HME search 202 may be HME predictors 222. For example, the HME predictors 222 may be a pair of reduced precision motion vectors. The HME predictors 222 may be good guesses on where to search for a match, as analyzed from downsampled source pixels 216.

The integer motion estimator (IME) 204 may perform a full search using the HME predictors 222, source pixels 224, and reference pixels 244 from the PAK 208. For example, the IME 204 can use a reduced precision motion vector found during the dual HME search 202 to obtain a precise motion vector. The IME 204 can compare all values of various block sizes for the coding units of the current frame recited from source pixels 214 with that of integer pixels in a search area of a reference image frame from reference pixels 244.

In some examples, the IME 204 may use up to 12 40×40 search windows or predictors. For example, the IME 204 may use four predictors, or any other number of predictors based on a performance mode. For example, a higher performance mode may select two spatial neighbors and two HME predictors, while a normal performance mode may be able to include four or more additional predictor candidates.

The check and refinement engine (CRE) 206 may partition the CU into pixel coding units using nested loops. For example, the partitioning may be based on a CU record 226 received from the IME 204. A CU record is an enumeration of every single shape within a CU, such as a 16×16 CU. Furthermore, some CU may be split into multiple Prediction Units (PUs) or Transform Units (TUs) that are more fine-grained within a CU. Various coding standards have multiple block sizes that could be selected such as 16×16, 8×8, 4×4s and so on. During the IME searches 204, some of the candidates found in the first full search can be combined with other candidates from the second full search. The CU record keeps track of the CU shapes and depending on the motion vectors found, some CUs can be combined via partitioning. The CRE 206 may use the MB record when determining combinations of integer motion estimation to use for generating residuals to be transformed and scored for comparison. As used herein, a residual refers to a difference between a predicted value and the value of a pixel from the source buffer or a reconstructed pixel from the PAK.

As indicated by a feedback loop from the CRE 206 to the IME 204, the CRE 206 may provide neighbor predictors 234 to the IME 204. The neighbor predictors 234 may be good guesses where to search for a match given what a preceding neighbor found as a good match. For example, the neighbor predictors 234 may include cost centers and search centers. For example, the cost centers may be based on advanced motion vector prediction (AMVP) and a merge list within the codec. The cost centers may represent the closest matching location to what the decoder would predict in a current block's motion vector by some combination of previously decoded neighbor motion vectors because a motion vector for the current block 228 may be coded differentially to the predicted motion vector. For example, if a predicted motion vector is (10,−5), then (10,−5) may be marked as the center of the search for a motion vector that has the best match and is close to that center. If, for example, (11,−5) is the best match, then the encoder can send (1,0) in the bit stream for the decoder to add to the predicted vector of (10,−5) to result at the correct location (11,−5).

The CRE 206 sends mode decisions to the PAK 208 as indicated by an arrow 230. In some examples, the mode decisions can be stored in memory 216 as indicated by another arrow 236.

The PAK stage 208 is to pack bits corresponding to the source pixels 232 as coded according to the mode decision into a data format. In some examples, the data is formatted according to a recursive video standard. Recursive video standards may include, but are not limited to, HEVC, VP9, etc. In various examples, the results are binarized into the different video formats based on the encoder mode selection received from the CRE 206. As shown by arrows 238 and 240, the results of the PAK stage 208 may include reference pixels 210 and a bit stream 212, which can be accurately and uniquely decoded by following the video standard. The encoder mode selection may yield a plurality of mode decisions. A mode decision, as used herein, refers to how the encoder represents each CU. The encoder mode selection may be set to encode the least number of bits with the highest amount of quality. In some examples, the PAK 208 may be set to encode at a 64×64 granularity. For example, in the case that a 64×64 block may be represented by a single bit, then a 64×64 granularity would be more efficient than a 32×32 granularity, which would require at least four bits. In some examples, the PAK 208 may be set to encode at a 32×32 granularity. On the other hand, the PAK 208 can be set to operate at a 32×32 granularity to lower the time it takes for statistics to be generated by the PAK 208. In some examples, as shown by feedback loop 242, such statistics may be sent from the PAK 208 to the CRE 206 and used to improve prediction at the CRE 206. For example, the statistics may be used for a slice size conformance feature to predict when a current slice is to be closed and another slice started to align slice sizes to network packets. In some examples, the PAK 208 may have an accurate bit stream size counter, while the rest of system 200 may use an approximate bit stream counter. Getting the feedback four times per 64×64 CU versus one time per 64×64 CU may enable more accurate slice size termination. In some examples, the reference pixels 210 may also be provided to the IME stage 204 as indicated by a feedback loop 244. For example, the IME stage 204 may compare a subsequent frame to the reference pixels 210 to find an appropriate block in the reference pixels 210. Thus, the reference pixels 210 may be used by the IME stage 204 to perform motion estimation as described herein.

In various examples, the PAK 208 may provide reconstructed pixels 246 as shown by arrow 248 to the TBC 120 and the LBC 122, as shown by arrows 250. For example, a feedback from PAK 208 of non-filtered reconstructed pixels may be included in the system 200. In various examples, the TBC 120 and LBC 122 also receive the source pixels 214. The LBC 122 can also generate block vector candidates based on the reconstructed pixels 246 and the source pixels 214, as indicated by an arrow 252. The TBC 120 can generate block vector candidates based on the reconstructed pixels 246 and the source pixels 214 and send the block vector candidates to the IME stage 204 to be included in the IME search described above, as indicated by an arrow 254. The best candidates may be the block vector candidates that have the lowest prediction error between the source pixels 214 and the reconstructed pixels 246. For example, the TBC 120 can generate the block vector candidates using the method 500 of FIG. 5. In various examples, the block vector candidates generated by the LBC 122 or the TBC 120 are full resolution candidate block vectors. In some examples, the LBC 122 or the TBC 120 can also generate downscaled search centers for further testing. For example, the search centers may be set to predictors used by the IME 204. The IME 204 may then perform searches around the search centers at the predictors. In some examples, the LBC 122 or the TBC 120 can generate downscaled candidates in a variety of shapes that are to be included with temporal inter motion estimation candidates.

In some examples, TBC 120 is based on a HME-like search on a 4× downsampled region to identify additional Stage3 IME predictors. For example, the LBC 120 is 1 dimensional search (BV.y=0 always) at full resolution. In various examples, TBC 120 and LBC 122 each have approximate search ranges of 3 64×64 LCUs.

In various examples, the IME 204 may process frames based on the frame type. For example, I-frames may be processed differently than B-frames. I-frames are single frames that are processed independently of other frames. For example, an I-frame may be the first frame after a changed scene in a video. B-frames use both previous and forward frames for data reference to get the highest amount of data compression. In some examples, with respect to I-frame behavior, the TBC HME may use original pixels (primary channel) from the top 3 LCUs. The TBC IME can use reconstructed non-filtered pixels (primary channel). The LBC IME can use reconstructed non-filtered pixels (primary channel). For example, the LBC IME may use N−1, N−2, and N−3 LCUs. The RD IBC can use reconstructed non-filtered pixels, of which the channel may vary. For example, the RD IBC may be based on an adaptive channel. If the IBC candidate is LBC, then the system 200 can switch to adaptive channel instead of primary channel for RD. In some examples, the TBC IME is not allowed to be IBC candidate when adaptive channel is true. Thus, the IME 204 may not select TBC IME candidate to make sure IBC candidate is LBC and uses adaptive channel for RDO. In addition, 64×64 CUs may be disabled for I-frame processing, although the LCU is still 64×64.

In various examples, B-frames may be processed similarly to I-frames. However, the LBC IME may use N−2, N−3, or N−4 LCUs. In addition, 64×64 CU candidates may be enabled for B-frames.

The PAL 124 can include a search algorithm, a palette prediction algorithm, and a palette management algorithm. The palette search algorithm may include four primary data structures, including a source buffer, a global predictor palette, a hashtable, and a potential new colors (PNC). In various examples, the source buffer may include W×H entries, each entry containing up to 30b color. For example, the source buffer may have 10b per color component. The global predictor palette (GPP) may be used to keep track of a palette of colors across CUs within a slice. The GPP can include N entries. For example, the N entries may be a preset number of entries, such as 128 entries. Each of the entries contains up to 30b color, 10b for each color component. The GPP also includes a count of occurrences in SRC buffer. For example, the count may be used to track the number of instances where a given entry was marked as best. In various examples, the GPP maintains separate counts per CU. The GPP also includes various flags. The flags can include a sticky flag, in_prev flag, and 6 valid flags, including four 8×8, one 16×16, and one 32×32. The GPP is persistent state across CUs. For example, the GPP may only be reset at each slice boundary. However, in various examples, the count and flags are reset for each CU type being analyzed.

The hashtable of the PAL 124 can include a preset number of entries M. For example, the number of entries M may match the number of entries N in the GPP. As one example, the number of entries may be 128. The hashtable entries may each include a hashkey used for indexing. In various examples, the hashkeys are quantized color components converted to linear IDs. The hashtable entries may also include up to 30b colors, with 10b per color component. Each of the hashtable entries also include a count. The count may be the count of occurrences in SRC buffer in which a given entry matched a given hashkey. In some examples, the hashtable entries may each also include a best distance. For example, the best distance may be the distance of each entry to the nearest Predictor Palette color. In some examples, each of the entries may also include various flags. For example, the flags can include a class0 flag valid flag, class1 valid flag, among other flags. In various examples, the hashtable may be reset for each 16×16 source buffer.

In various examples, the PNC is a helper data structure for the hashtable. For example, the PNC may contain colors identified as good palette candidates that cannot be committed until RD feedback at 32×32 boundaries. In some examples, the PNC contains up to 32 colors per 32×32.

Still referring to FIG. 2, the palette prediction algorithm of the PAL 124 may include a two-pass color search and mapping algorithm, in which a source buffer is iterated twice. For example, the first pass may be used to populate the hashtable. In some examples, each source pixel is compared to the predictor palette to find a color in the predictor palette with the closet match. In some examples, the distance metric is programmable. For example, the distance metric used can be the Euclidean distance (SSE), the Chebyshev distance (Max(E)), or the Manhattan distance (Sum(E)), among other distance metrics. The source pixel values are then converted to hashkeys and added to the hashtable. In some examples, various metrics and flags in both the hashtable and global predictor palette are updated. For example, these metrics and flags may be used to determine if a color is valid for the second pass. As used herein, a valid color refers to a color in new candidate colors, the potential new colors (PNC) data structure, or the global predictor palette (GPP). The second pass of the palette prediction algorithm performs palette prediction mapping. For example, the closest color to the source can be selected from a combination of valid hashtable colors, valid global predictor palette colors, and PNC colors. In some examples, PNC colors for 32×32 CUs may be left out.

In various examples, based on the generated palette prediction mapping, a residual is sent to the RDO logic within the PAL 124 along with color index mapping for bit cost estimation. The residual is a predicted difference from source pixel. In some examples, the bit cost estimation and quality calculation (SSE) can be performed by the PAL 124 and provided to the CRE/RDO. For example, the PAL 124 can perform a scan bit estimation. In some examples, scan bit estimation is processed a whole CU at a time. A CU is considered as one "row" using a horizontal or a vertical traverse scan. In some examples, this "row" is cut on runs using a greedy method. For example, for every start run point, the method can check the possible length of both COPY_INDEX and COPY_ABOVE types and choose the longest one. For example, if both have the same length, the method can choose COPY_INDEX. The current start run point plus length become new start run point. For every run, the method can estimate the number of bits which will be spent to encode this run. For example, the number of bits may include run length bits, run type bits and index bits.

The PAL 124 can also perform a quality calculation using sum of square error, or any other suitable quality metric. In some examples, palette SSE is based on the SSE of the RDO channel. In various examples, quantization or de-quantization is applied to calculate the SSE on ESC pixels. The palette bits include palette index coding bits, palette new entry coding bits, and ESC bits of the RDO channel. The final palette bit cost, as measure in number of bits, can be calculated using the equation:

$$\text{num}_{PltBits} = ((\text{num}_{PltIdxBits} * \text{weight}_{pltIdxBits} + 32)/64 + \\ ((\text{num}_{PltNewEntryBits} * \text{weight}_{newPltBits} + 32)/64 + \\ \text{num}_{EscBits}) \quad \text{Eq. 1}$$

where $\text{num}_{PltIdxBits}$ is the number of palette index bits, $\text{num}_{PltNewEntryBits}$ is the number of new color entry bits, $\text{num}_{EscBits}$ is the number of escape bits, $\text{weight}_{pltIdxBits}$ is the weight applied to the palette index bits, and $\text{weight}_{newPltBits}$ is the weight applied to the new entry bits. In some examples, the weights can be changed uniformly to change bit rate. In various examples, independent weights can be assigned to older colors in the GPP and newer colors not existing in the GPP to promote the likelihood or demote the likelihood of new colors being added.

In various examples, the CRE/RDO 206 can perform a strict RDO comparison between intra and PAL modes. For example, the CRE/RDO 206 may pick a palette candidate only when both the quality (SSE) and bit cost are smaller than intra SSE and bit cost. If the palette candidate wins, then the CRE/RDO 206 can use its normal RDO distortion for the comparison with inter and skip candidates. For example, the normal RDO distortion for the palette candidate may be SSE+bit cost.

If the RDO cost of the proposed palette prediction is the best mode decision, palette prediction is selected as the mode decision by the CRE 118, and the global predictor palette is updated by the PAL 124. In various examples, the global predictor palette is maintained as a sorted list. As one example, the sorted list may place used previously existing colors first, newly added colors second, and all un-used existing colors last. Given the finite length limit of global predictor palette, colors last in the sorted list may be dropped. For example, un-used colors can be dropped to make room for new colors in the global predictor palette. In some examples, if the palette prediction is not selected as the best mode decision, then the global predictor palette is unchanged.

In some examples, the PAK 208 may also perform PAK only multi-pass without performing motion estimation and mode decision for small frame QP changes. For example, if multiple passes are needed to achieve a desired frame size by the bit rate control (BRC) algorithm, two options may be presented for a second pass. In the first option, the PAK 208 can redo the entire encoding based on the updated costings with the new QP. In the second option, the PAK 208 can bypass the encoding and replay the mode decisions from the first pass with a modified QP only using the PAK 208 hardware. For example, the PAK 208 may retrieve mode decisions saved to memory 216 as indicated by an arrow 236. The second option may save both power and time. In some examples, the first or second option may be selected based on a threshold level of frame QP changes. For example, the PAK may perform a PAK only multi-pass in response to detecting a frame QP change that is less than a first threshold and higher than a second threshold. Thus, the HME 202, IME 204, and CRE 206 may be bypassed and computing resources can be saved to increase precision by small amounts.

The diagram of FIG. 2 is not intended to indicate that the example pipeline 200 is to include all of the components shown in FIG. 2. Rather, the example pipeline 200 can be implemented using fewer or additional components not illustrated in FIG. 2 (e.g., additional stages, feedback loops, etc.). For example, the TBC 120 and LBC 122 may be part of an intra block copy (IBC) unit.

Figure 3:
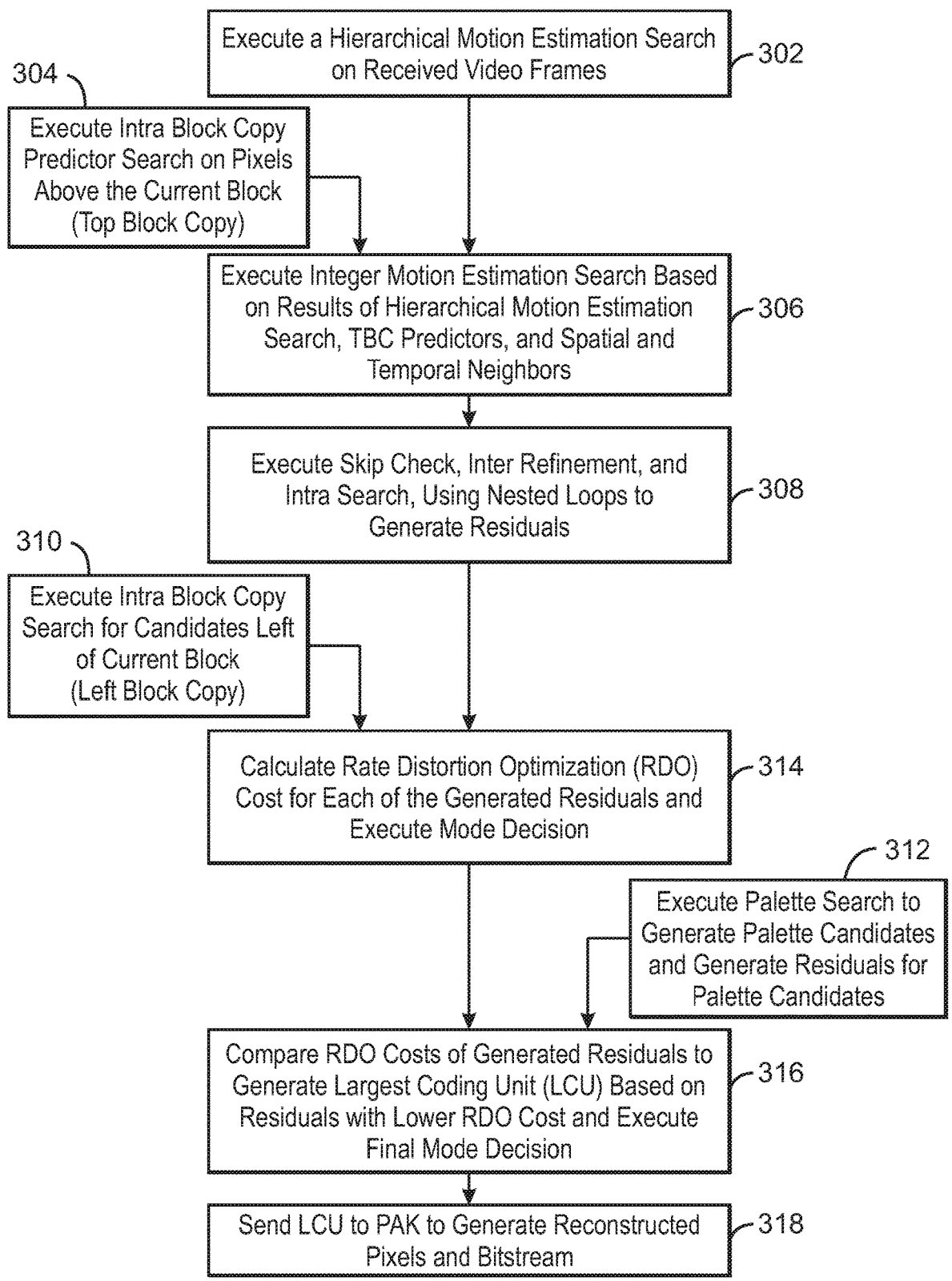
FIG. 3 is a process flow diagram of an example method for encoding video using multi-pass palette prediction and intra-block copy.

FIG. 3 is a process flow diagram of an example method for encoding video using multi-pass palette prediction and intra-block copy. The method 300 can be implemented in the system 100 above or the electronic device 600 below.

At block 302, a hierarchical motion estimation search is performed on two received video frames. In some examples, the hierarchal motion estimation search is performed using downscaled references. For example, each largest coding unit (LCU) (64×64) of each video frame can be downscaled to 8×8 blocks and searched at $\frac{1}{8}^{th}$ resolution. Results may then be provided to $\frac{1}{4}^{th}$ resolution search stage. Finally, a list of candidates may be generated for a 1× resolution IME for each 32×32 CU of the 64×64 LCU. This may be done as 64×64 to ensure the 8× downsampled 8×8 is large enough to have enough features to track small to medium sized objects, as opposed to using 32×32 downscaled by 8× and searching for 4×4 matches. The list of 1× IME candidates may include spatial neighbors, HME derived predictors, temporal predictors, and user-provided predictors. In some examples, the number of predictors used by the IME may be based on a performance mode. For example, in a high performance mode, the IME may choose 12 predictors from a set of predictors. In a lower performance mode, the IME may use only four predictors. In some examples, the predictors may be sorted based on a predefined ranking list that assigns each predictor a priority number. For example, higher priority predictors may be selected based on priority number if a subset of predictors is used. In some examples, redundant predictors may be detected using a search center distance parameter that may be used to analyze overlap between predictors. If a predictor is redundant with respect to a predictor that was already used for a search, then the redundant predictor may be dropped and a predictor with a next higher priority number may be used. In some examples, the amount of overlap used to determine redundancy may be a programmable threshold.

At block 304, an intra block copy predictor search is executed on pixels above the current block. This predictor search is also referred to herein as a top block copy (TBC). In various examples, TBC generates a predictor that IME then searches around at block 306 to find a good candidate. For example, a predictor may be one or more candidates all grouped nearby each other. For example, a region of pixels is selected above current block and the selected region is downscaled along with source block. An exhaustive search is then performed identifying the best block vector candidates in different shape arrangements. For example, the shape arrangements can include square, rectangle pairs, and square quads, among other shape arrangements. In some examples, the best block vector candidates are sent at full resolution for including in the integer motion estimation at block 306. In some examples, a two-dimensional search of a current picture is executed. The two-dimensional search can generate a full-resolution candidate block vector or a down-scaled search center for further testing. Downscaled candidates may thus be generated in a variety of shapes to be included with temporal inter motion estimation (IME) candidates at block 306.

At block 306, an integer motion estimation (IME) search is executed based on the results of the hierarchical motion estimation search, the TBC predictors, and spatial and temporal neighbors. For example, an integer motion estimation search may be performed around the TBC predictors, and any combination of the TBC predictors and other predictors. The search may be performed to identify a candidate that will win. In some examples, the search may also be for a predictor for which further search will be done to find the final candidate. In some examples, the IME search may include the use of spatial and temporal neighbor predictors. The result of the 32×32 IME may be a list of 49 square and rectangle shapes subdividing the 32×32 into various coding unit (CU) and prediction unit (PU) combinations. In various examples, these results may undergo fractional and bidirectional improvements.

At block 308, a check and refinement may be executed using nested loops to generate residuals. For example, the residuals may be generated based on at least one spatial domain prediction and at least one frequency domain prediction. The CRE nested loop can process CUs in a bottom-up fashion resolving each 8×8 first then comparing 4×8×8 vs 1×16×16, then 4×16×16 vs 1×32×32, lastly 4×32×32 vs 1×64×64, as described in greater detail with respect to FIG. 3 above. In some examples, each of the nested loops can be a CU tree of multiple depths up to the level described and the levels beneath. For example, if the 4×8×8 has a lower RDO cost than the 1×16×16, then that 4×8×8 would be considered as the 1×16×16 for larger comparisons with 4×16×16 groupings. In some examples, merge tapering may be used for additional candidate generation. For example, while executing the skip (merge) processing of a given CU level, partial results can be saved and re-used as lower level CU inter candidates. The lower level CU inter candidates may then be AMVP coded rather than merge coded. In some examples, LCU based neighbor reconstruction may be used for improved performance. For example, top row and left LCU edge pixels can be reconstructed and fed back from PAK to provide more accurate intra prediction without substantially affecting hardware complexity due to the 32×32 Z-pattern walk within a 64×64 LCU.

At block 310, an intra block copy search is executed for candidates left of the current block. This search is also referred to herein as a left block copy (LBC). In LBC, the predictor may be any pixels to the immediate left of the current block. In some examples, a one-dimensional search of a current picture is executed. For example, a one dimensional search is performed by comparing a current block with pixels to the left of the current block. In various examples, nearby blocks can be omitted or included based on performance and quality factors. The one-dimensional search is to generate a full-resolution candidate block vector or a down-scaled search center for further testing.

At block 312, a palette search is executed to generate palette candidates and generate residuals for the palette candidates. For example, the palette search may include a multi-pass palette search and mapping. In some examples, a target block is scanned to detect frequent or unique colors with respect to previously identified colors and use the union of the frequent or unique colors and previously identified colors to remap the target block into an index of the frequent or unique colors. In various examples, the target block is analyzed using a hashtable with a hashkey derived from a programmable hash quantization of each color channel. In some examples, a plurality of thresholds are used to categorize candidate colors based on a distance from previously identified colors, an occurrence count, and an escape replacement. In various examples, a partially delayed coding tree decision is executed, including determining whether each of a plurality of palette coding units is a final winner within a larger coding unit. In some examples, a variable color distance selection is executed. In various examples, binarization complexity can be controlled based on maximum total runs and maximum total escape pixels. In various examples, a palette RDO is also executed to generate a bit cost for the palette candidates. In some examples, a palette quality metric is calculated. For example, the metric used may be a sum of square error metric. For example, the palette search can be executed using method 400 of FIG. 4.

At block 314, a rate distortion optimization (RDO) cost is calculated for each of the generated residuals and a mode decision is executed. For example, the mode decision may be executed for transform unit sizes up to a size of a coding unit. For example, each of the generated residuals may be transformed into the frequency domain via a discrete cosine transformation and then quantized.

In some examples, the CRE can make per CU QP adjustments based on motion length. For example, motion can be classified as static, low motion and high motion. In some examples, an additional motion length stage can be included to provide an additional delta QP adjustment. For example, the human visual system may more sensitive to artifacts on static objects than objects with high motion. Thus, the QP can be decreased and increased in the PAK MB object to blur details and enhance them, respectively. In this manner, additional bits can be saved in areas where the human visual system may be less sensitive.

At block 316, the RDO costs of the generated residuals may be compared to generate a largest coding unit (LCU) based on residuals with a lower RDO cost and a final mode decision is executed. For example, while the IME and CRE may use Sum of Absolute Transform Distortion (SATD) for the decision criteria, a final mode decision may be based on RDO estimated sum of square errors (SSE) of the reconstructed block (distortion) along with the estimated bit cost based on the number of non-zero coefficients, their magnitudes, and their frequencies. The generated LCU may then be sent to the PAK to be used to encode a 32×32 or 64×64 portion of a video frame at the PAK based on the generated LCU.

At block 318, the LCU is sent to a PAK to generate reconstructed pixels and a bit stream. The LCU may correspond to a portion of an image to be reconstructed and stored locally. The reconstructed image can used by the IME during encoding of the next frame. For example, the IME can perform motion estimation on the reconstructed pixels. The bit stream can be sent to a display device.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation. For example, the method 300 may also include receiving a performance mode. In some examples, a number of candidates considered for motion estimation can be increased or decreased based on the performance mode. In some examples, a number of angles considered for motion estimation can be increased or decreased based on the performance mode. In some examples, a number of predictors considered for integer motion estimation can be increased or decreased based on the performance mode.

Figure 4:
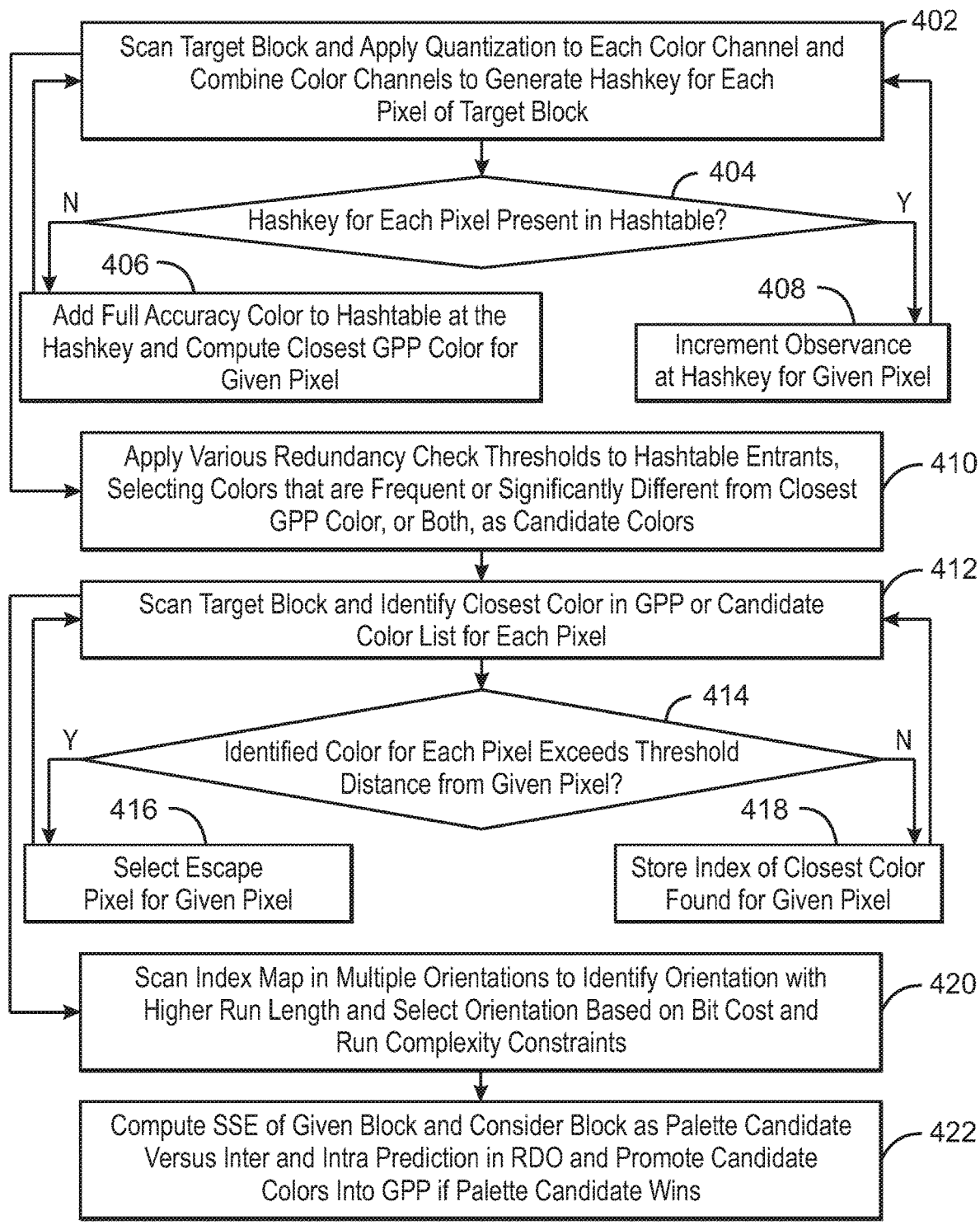
FIG. 4 is a process flow diagram illustrating an example method for performing palette prediction.

FIG. 4 is a process flow diagram of an example method performing palette prediction. The method 400 can be implemented in the system 100 above or the electronic device 600 below.

At block 402, a target block is scanned and quantization applied to each color channel. The color channels are combined to generate a hashkey for each pixel of the target block.

At decision diamond 404, a determination is made as to whether the hashkey for each pixel of the target block is present in a hashtable. If the hashkey is not present in the hashtable, then the method continues at block 406. If the hashkey is present in the hashtable, then the method may continue at block 408.

At block 406, a full accuracy color is added to the hashtable at the hashkey and a closest global predictor palette (GPP) color is computed for a given pixel. For example, the closest GPP color may be computed using any color distance metric.

At block 408, an observance is incremented at the hashkey for the given pixel. For example, an observances field associated with the hashkey can be incremented by one.

At block 410, various redundancy check thresholds are applied to hashtable entrants. Colors that are frequent or significantly different from the closest GPP color, or both, are selected as candidate colors.

At block 412, the target block is scanned and a closest color in the GPP or candidate color list is identified for each pixel. The candidate color list may include any colors that exceeded the thresholds of block 410. The color distance can be measured using any suitable metric. For example, the color distance metric used can be the Euclidean distance, the Chebyshev distance (Max(E)), or the Manhattan distance (Sum(E)). In some examples, the color distance metric is programmable.

At decision diamond 414, a determination is made as to whether an identified color for each pixel exceeds a threshold distance for a given pixel. If the identified color exceeds the threshold distance, then the method continues at block 416. If the identified color does not exceed the threshold distance, then the method continues at block 418.

At block 416, an escape pixel is selected for a given pixel. For example, the escape pixel can be used to indicate that a given pixel is to be encoded using an individual pixel.

At block 418, an index of the closest color found for a given pixel is stored. For example, if the GPP has 3 colors (red, green blue) at index (0,1,2), with a new candidate color white at (3), the block could be any combination of 0, 1, 2, and 3, which results in a block with red, green, blue, and white at those respective locations.

At block 420, an index map is scanned in multiple orientations to identify an orientation with a higher run length. An orientation is selected based on bit cost and run complexity constraints.

At block 422, a sum of squared errors (SSE) of a given block is computed. The block is considered as a palette candidate versus inter and intra prediction in a rate distortion optimization (RDO). Candidate colors are promoted into the GPP if the palette candidate wins.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation. For example, the method 400 may also be repeated with updated thresholds at block 402, 410, 414 to generate new results at 420 to improve the results.

Figure 5:
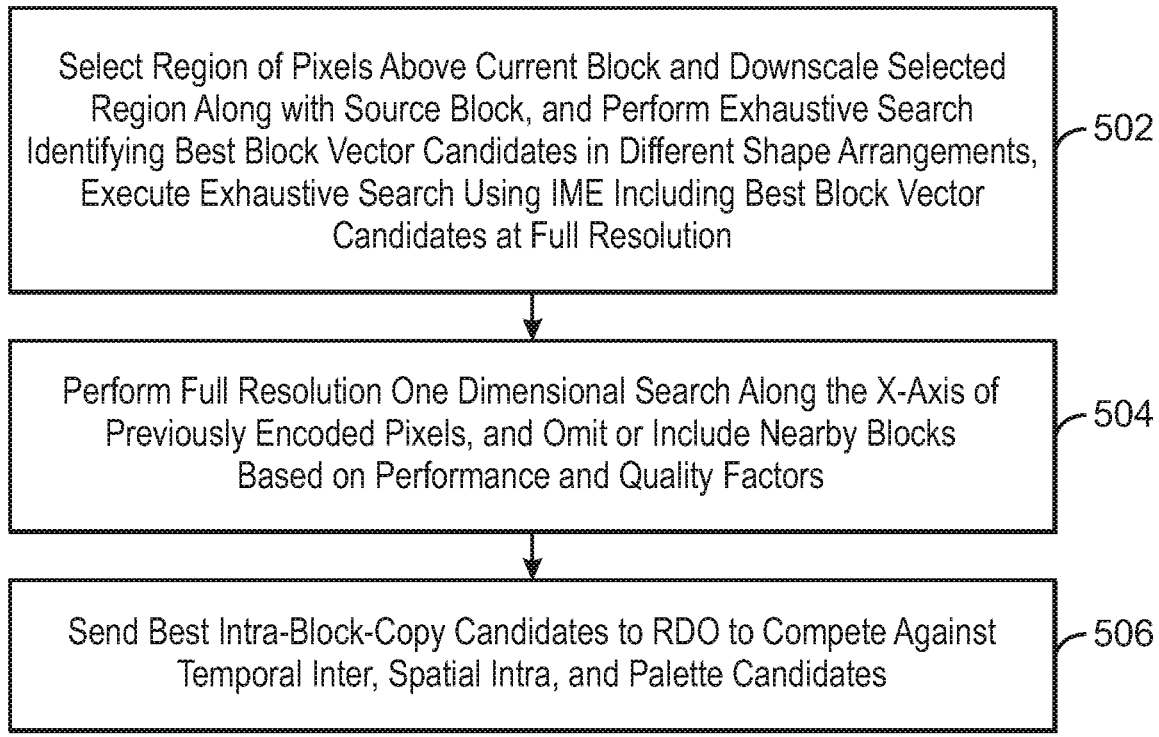
FIG. 5 is a process flow diagram of an example method for performing intra block copy.

FIG. 5 is a process flow diagram of an example method for performing intra block copy. The method 500 can be implemented in the system 100 above or the electronic device 600 below.

At block 502, a region of pixels is selected above a current block and the selected region is downscaled along with a source block. For example, the three nearest LCUs may be selected, including the top, top left, and top of a current LCU. An exhaustive search is performed to identify the best block vector candidates in different shape arrangements. For example, the shape arrangements can include square, rectangle pairs, and square quads, among other shape arrangements. An exhaustive search is executed using IME with the best block vector candidates included at full resolution.

At block 504, a full resolution one dimensional search is performed along an x-axis of previous encoded pixels. For example, the previously encoded pixels may be to the left of the current block. Nearby blocks are omitted or included based on performance and quality factors. For example, the performance factors can include reconstruction by the PAK. If processing waited for the immediate previous block to the left to be reconstructed, the method waits and that reduces performance. In order to keep all units busy all the time for maximum throughput, the method can increase performance by not waiting. In some examples, nearby blocks are thus omitted or included based on depending on how fast the PAK is. The quality factors can include consideration of all blocks to the left and the resulting improvement in quality. In some examples, near blocks can be excluded for improved performance by reducing feedback dependency.

At block 506, best intra-block-copy candidates are sent to an RDO to compete against temporal inter, spatial intra, and palette candidates. For example, the candidate intra-block-copy candidate can be compared with other candidates based on quality and bit cost. Thus, the techniques of blocks 502 and 504 can be combined for high accuracy search within performance constrained encoding.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation.

Figure 6:
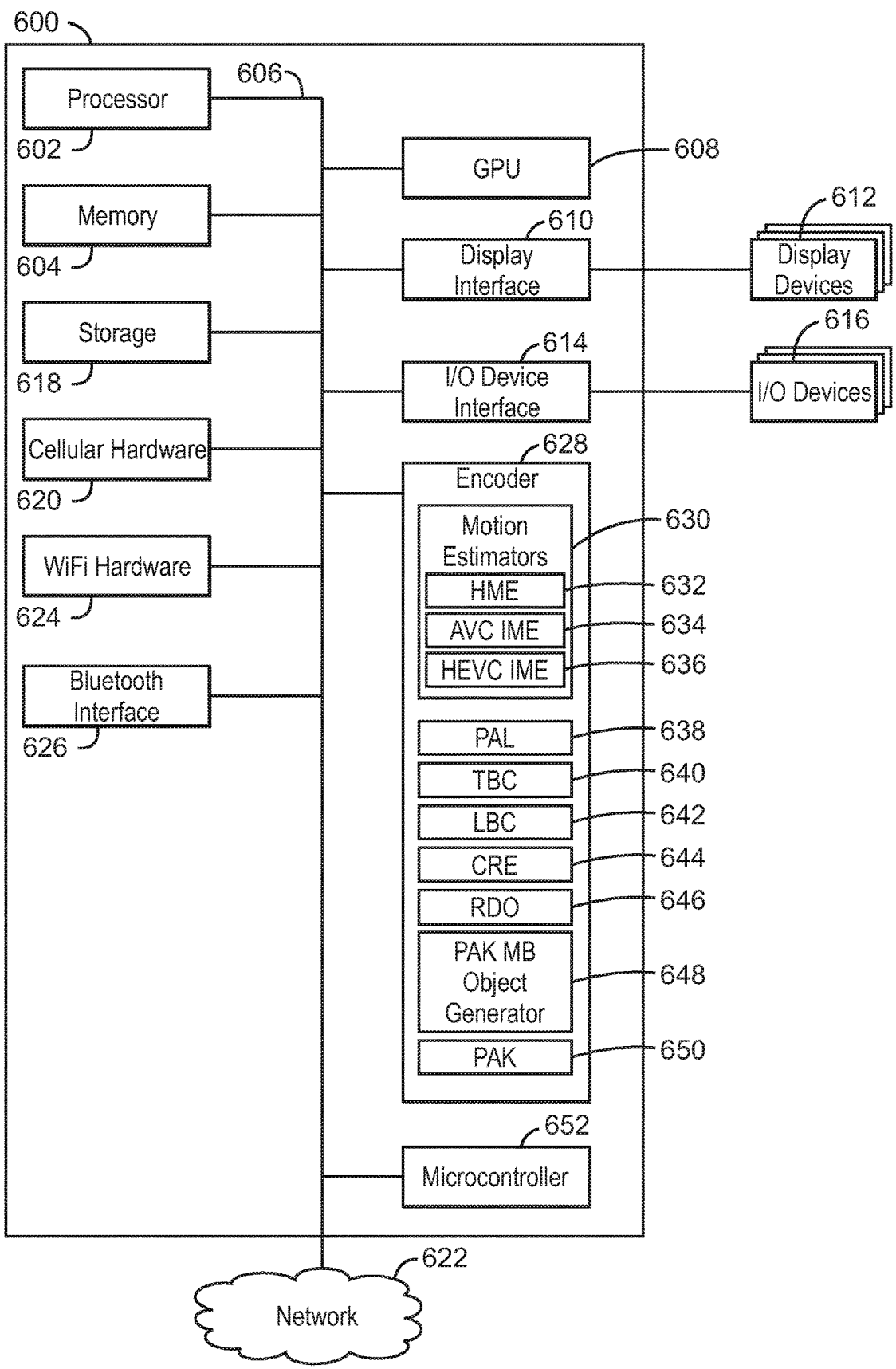
FIG. 6 is a block diagram illustrating an example electronic device that enables hardware video encoding with palette and intra-block copy.

FIG. 6 is a block diagram of an electronic device 600 that enables hardware video encoding with palette and intra-block copy. The electronic device 600 may be, for example, a server, laptop computer, tablet computer, mobile phone, smart phone, or a wearable device, drone, among others. The electronic device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the electronic device 600 may include more than one CPU 602. The memory device 604 can include random access memory (RAM), read only memory (ROM), flash memory, or any other suitable memory systems. For example, the memory device 604 may include dynamic random access memory (DRAM).

The electronic device 600 also includes a graphics processing unit (GPU) 608. As shown, the CPU 602 can be coupled through the bus 606 to the GPU 608. The GPU 608 can be configured to perform any number of graphics operations within the electronic device 600. For example, the GPU 608 can be configured to render or manipulate graphics images, graphics frames, videos, or the like, to be displayed to a user of the electronic device 600. In some embodiments, the GPU 608 includes a number of graphics engines, wherein each graphics engine is configured to perform specific graphics tasks, or to execute specific types of workloads. For example, the GPU 608 may include an engine that processes video data via lossless pixel compression.

The CPU 602 can be linked through the bus 606 to a display interface 610 configured to connect the electronic device 600 to a plurality of display devices 612. The display devices 612 can include a display screen that is a built-in component of the electronic device 600. The display devices 612 can also include a computer monitor, television, or projector, among others, that is externally connected to the electronic device 600.

The CPU 602 can also be connected through the bus 606 to an input/output (I/O) device interface 614 configured to connect the electronic device 600 to one or more I/O devices 616. The I/O devices 616 can include, for example, a keyboard and a pointing device, wherein the pointing device can include a touchpad or a touchscreen, among others. The I/O devices 616 can be built-in components of the electronic device 600, or can be devices that are externally connected to the electronic device 600.

The electronic device 600 may also include a storage device 618. The storage device 618 is a physical memory such as a hard drive, an optical drive, a flash drive, an array of drives, or any combinations thereof. The storage device 618 can store user data, such as audio files, video files, audio/video files, and picture files, among others. The storage device 618 can also store programming code such as device drivers, software applications, operating systems, and the like. The programming code stored to the storage device 618 may be executed by the CPU 602, GPU 608, or any other processors that may be included in the electronic device 600.

The CPU 602 may be linked through the bus 606 to cellular hardware 620. The cellular hardware 620 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 600 may access any network 622 without being tethered or paired to another device, where the network 622 is a cellular network.

The CPU 602 may also be linked through the bus 606 to WiFi hardware 624. The WiFi hardware is hardware according to WiFi standards (standards promulgated as Institute of Electrical and Electronics Engineers' (IEEE) 802.11 standards). The WiFi hardware 624 enables the electronic device 600 to connect to the Internet using the Transmission Control Protocol and the Internet Protocol (TCP/IP), where the network 622 is the Internet. Accordingly, the electronic device 600 can enable end-to-end connectivity with the Internet by addressing, routing, transmitting, and receiving data according to the TCP/IP protocol without the use of another device. Additionally, a Bluetooth Interface 626 may be coupled to the CPU 602 through the bus 606. The Bluetooth Interface 626 is an interface according to Bluetooth networks (based on the Bluetooth standard promulgated by the Bluetooth Special Interest Group). The Bluetooth Interface 626 enables the electronic device 600 to be paired with other Bluetooth enabled devices through a personal area network (PAN). Accordingly, the network 622 may be a PAN. Examples of Bluetooth enabled devices include a laptop computer, desktop computer, Ultrabook, tablet computer, mobile device, or server, among others.

The electronic device 600 may include an encoder 628. The encoder 628 may be a hardware encoder without programmable engines executing within the main loop of an encoder algorithm. In embodiments, this may be referred to as fixed function encoding. Generally, coding video data includes encoding the video to meet proper formats and specifications for recording and playback. The motion estimators 630 may be an algorithms executed by fixed function hardware of the encoder 628. Motion estimation is an important and computationally intensive task in video coding and video compression. In some examples, the motion estimators 630 may include an HME 632, an AVC IME 634, and an HEVC IME 636. For example, the HME 632 may perform a coarser grained search as described above. Parameters such as multi-pass packing (PAK) parameters may calculated based on a target size or bit rate by a PAK module 632. In embodiments, the encoder can be used in an iterative fashion to enable conditional multi-pass encoding. For example, the encoder may use tile or frame based repetition.

The electronic device 600 includes a palette prediction module PAL 638. The PAL 638 can execute a multi-pass palette search and mapping on a video frame to generate palette candidates. In some examples, the PAL 638 can scan a target block to detect frequent or unique colors with respect to previously identified colors and use the union of the frequent or unique colors and previously identified colors to remap the target block into an index of the frequent or unique colors. In various examples, the PAL 638 can analyze a target block using a hashtable with a hashkey derived from a programmable hash quantization of each color channel. In some examples, PAL 638 can use a plurality of thresholds to categorize candidate colors based on a distance from previously identified colors, an occurrence count, and an escape replacement. The PAL 638 can include a multi-level candidate structure of potential new colors and a guard-banded selection of previously identified colors. In various examples, the PAL 638 can execute a partially delayed coding tree decision including determining whether each of a plurality of palette coding units is a final winner within a larger coding unit. In some examples, the PAL 638 can execute a variable color distance selection. In various examples, the PAL 638 can control binarization complexity based on maximum total runs and maximum total escape pixels. For example, the PAL 638 can be used to perform the method 400 of FIG. 4.

The electronic device 600 also includes top block copy unit (TBC) 640. The TBC 640 can generate downscaled candidates in a variety of shapes to be included with temporal inter motion estimation candidates. In some examples, the TBC 640 can execute a two-dimensional search of a current picture. The two-dimensional search is to generate a full-resolution candidate block vector or a down-scaled search center for further testing. The TBC 640 can be used to perform the method 500 of FIG. 5.

The electronic device 600 further includes a left block copy unit (LBC) 642. The LBC 642 can execute an intra block copy prediction on the video frame to generate intra-block-copy candidates. In some examples, the LBC 642 can control a one-dimensional search region to omit or include nearest reconstructed pixels. In some examples, the TBC 640 can execute a one-dimensional search of a current picture. The one-dimensional search is to generate a full-resolution candidate block vector or a down-scaled search center for further testing. The LBC 642 can also be used to perform the method 500 of FIG. 5.

The electronic device 600 further includes a check and refinement module (CRE) 644. The CRE 644 may generate residuals based on one or more predictions. The electronic device 600 also includes an RDO 646 to calculate RDO costs for residuals. For example, the RDO 646 can calculate an RDO cost for a set of generated residuals, the palette candidates, and the intra-block-copy candidates. In some examples, the RDO can include a forward transform and quantizer (FTQ) to transform residuals into the frequency domain and quantize the residuals. The RDO 646 may then calculate RDO costs for the quantized residuals.

The electronic device 600 also includes a PAK MB object generator 648 to execute a final mode decision for generating an LCU and generate a PAK MB object to send to the PAK 650 for using to encode a frame. For example, the PAK MB object generator 648 can execute a final mode decision based on a comparison of the rate distortion optimization (RDO) costs. In various examples, the PAK MB object may include a combination of CU sizes and estimation types. The electronic device 600 thus includes a PAK 650 to encode a video frame using the received PAK MB object.

The electronic device 600 also includes a microcontroller 646. The microcontroller 646 may process information that is used to override functions of the encoder 628 or the PAK 650. This override may be enabled through costings and other statistics as described above. For example, the microcontroller 646 may be provided a histogram of luminance data for analysis and comparison with previous frames to determine in a fade-in or a fade-out event is occurring. In some examples, the histogram for each of two frames may be converted using a cumulative distribution function and an offset between the resulting curves may be used to determine a weight factor. The microcontroller 646 may compute average luminance difference between frames and generate a weighted prediction parameter to normalize variation in luminance in prediction of motion vectors. In some examples, the weighted prediction parameter may be included in a bit stream sent to a decoder so that the decoder may apply the same weight factor to accurately decode video frames.

The block diagram of FIG. 6 is not intended to indicate that the electronic device 600 is to include all of the components shown in FIG. 6. Rather, the computing system 600 can include fewer or additional components not illustrated in FIG. 6 (e.g., sensors, power management integrated circuits, additional network interfaces, etc.). The electronic device 600 may include any number of additional components not shown in FIG. 6, depending on the details of the specific implementation. Furthermore, any of the functionalities of the CPU 602 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 7:
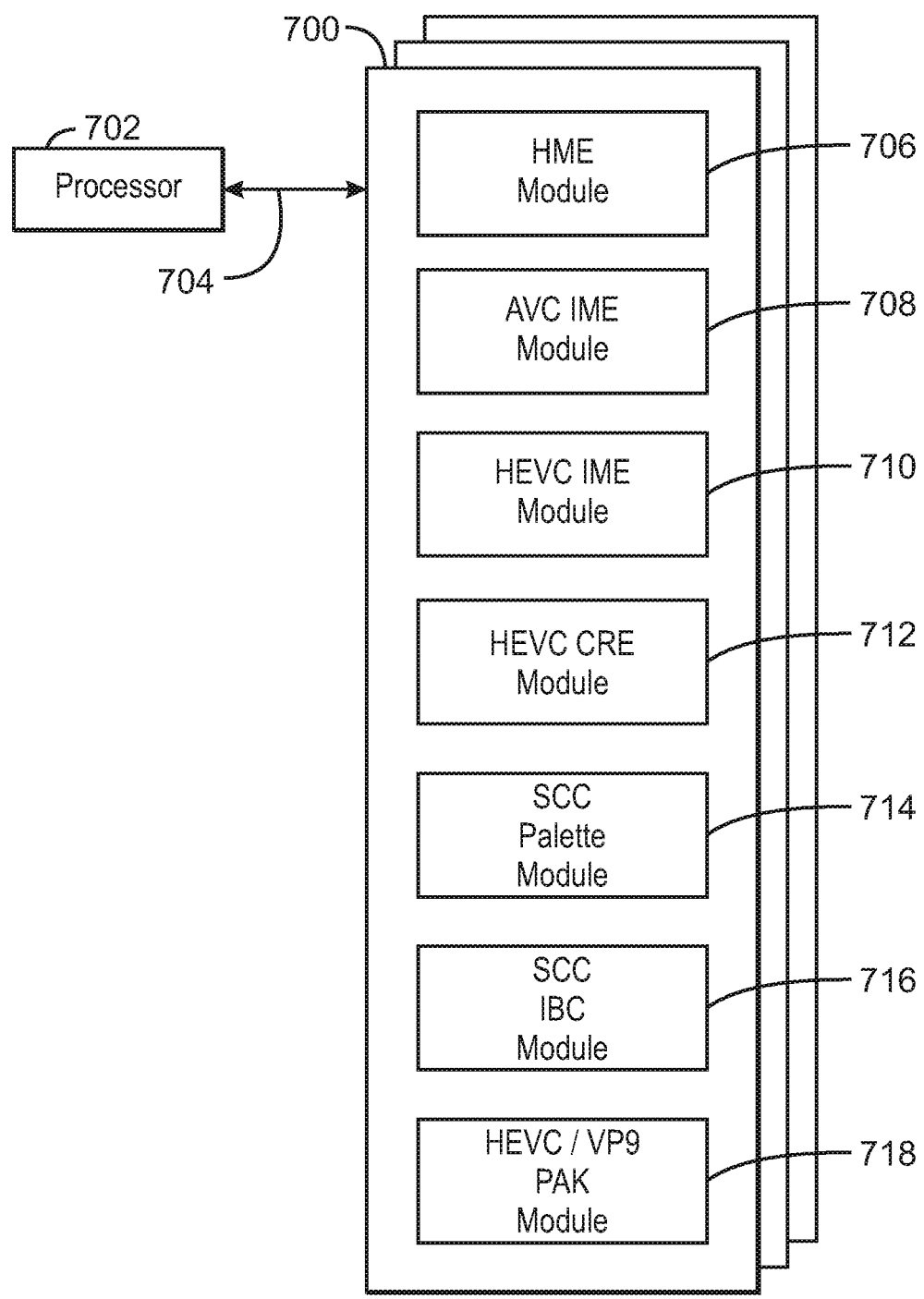
FIG. 7 is a block diagram showing an example medium that contains logic for hardware video encoding using multi-pass palette prediction and intra-block copy.

FIG. 7 is a block diagram showing a medium 700 that contains logic for hardware video encoding using multi-pass palette prediction and intra-block copy. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-718 configured to perform the techniques described herein. For example, an HME module 706 may be configured to determine an encoding mode based on a downscaled motion estimation search. An AVC IME module 708 may be configured to execute an IME search. For example, the IME search may be based on the results of the dual HME search. An HEVC IME module 710 may perform a second IME search based on the results of the first IME search. An HEVC CRE module 712 may determine coding units and corresponding encoder modes in which to encode frames of video. A screen content coding (SCC) palette module 714 may be configured to perform a palette search, a palette prediction, and palette management. In some examples, the SCC palette module 714 can scan a target block to detect frequent or unique colors with respect to previously identified colors and use the union of the frequent or unique colors and previously identified colors to remap the target block into an index of the frequent or unique colors. In various examples, the SCC palette module 714 can analyze a target block using a hashtable with a hashkey derived from a programmable hash quantization of each color channel. In some examples, the SCC palette module 714 can use a plurality of thresholds to categorize candidate colors based on a distance from previously identified colors, an occurrence count, and an escape replacement. In various examples, the SCC palette module 714 can execute a partially delayed coding tree decision including determining whether each of a plurality of palette coding units is a final winner within a larger coding unit. The SCC palette module 714 can include a multi-level candidate structure of potential new colors and a guard-banded selection of previously identified colors. In some examples, the SCC palette module 714 can execute a variable color distance selection. In various examples, the SCC palette module 714 can control binarization complexity based on maximum total runs and maximum total escape pixels. For example, the palette module 714 can be configured to perform the method 400 of FIG. 4. An SCC intra block copy (IBC) module 716 may be configured to perform top block copy (TBC) and left block copy (LBC). In some examples, the IBC module 716 can execute a one-dimensional search and a two-dimensional search of a current picture, wherein the one-dimensional search, the two-dimensional search, or both, is to generate a full-resolution candidate block vector or a down-scaled search center for further testing. In various examples, the IBC module 716 can generate downscaled candidates in a variety of shapes to be included with temporal inter motion estimation candidates. In some examples, the IBC module 716 can control a one-dimensional search region to omit or include nearest reconstructed pixels. For example, the SCC IBC module 716 may be configured to perform the method 500 of FIG. 5. Finally, at block 718, a HEVC/VP9 PAK module packs bits into packets corresponding to the encoder mode decision for consumption by a consumer. For example, the packets may be sent to a decoder to unpack the packets into video frames.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Encoder algorithms must reduce a practically unlimited number of syntax and tool combinations defined by a specification into a single option that all decoders are able to understand. The present techniques result in an option that uses the least amount of power, or provides the most amount of video fidelity, or the most amount of compression, or some combination of these metrics. In embodiments, the present techniques focus on video compression at 4K resolution in low power with subjective video quality enhancements.

EXAMPLES

Example 1 is a system for video encoding. The system includes a processor to execute a multi-pass palette search and mapping on a video frame to generate palette candidates. The processor is to execute an intra block copy prediction on the video frame to generate intra-block-copy candidates. The processor is to calculate a rate distortion optimization (RDO) cost for a set of generated residuals, the palette candidates, and the intra-block-copy candidates. The processor is to execute a final mode decision based on a comparison of the rate distortion optimization (RDO) costs.

Example 2 includes the system of example 1, including or excluding optional features. In this example, the processor is to scan a target block to detect frequent or unique colors with respect to previously identified colors and use a union of the frequent or unique colors and previously identified colors to remap the target block into an index of the frequent or unique colors.

Example 3 includes the system of any one of examples 1 to 2, including or excluding optional features. In this example, the system includes a hashtable. The processor is to analyze a target block using the hashtable with a hashkey derived from a programmable hash quantization of each color channel.

Example 4 includes the system of any one of examples 1 to 3, including or excluding optional features. In this example, the processor is to use a plurality of thresholds to categorize candidate colors based on a distance from previously identified colors, an occurrence count, and an escape replacement.

Example 5 includes the system of any one of examples 1 to 4, including or excluding optional features. In this example, the processor includes a multi-level candidate structure of potential new colors and a guard-banded selection of previously identified colors. The processor is to execute a partially delayed coding tree decision including determining whether each of a plurality of palette coding units is a final winner within a larger coding unit.

Example 6 includes the system of any one of examples 1 to 5, including or excluding optional features. In this example, the processor is to execute a variable color distance selection.

Example 7 includes the system of any one of examples 1 to 6, including or excluding optional features. In this example, the processor includes binarization complexity controls based on maximum total runs and maximum total escape pixels.

Example 8 includes the system of any one of examples 1 to 7, including or excluding optional features. In this example, the processor is to execute a one-dimensional search and a two-dimensional search of a current picture. The one-dimensional search, the two-dimensional search, or both, is to generate a full-resolution candidate block vector or a down-scaled search center for further testing.

Example 9 includes the system of any one of examples 1 to 8, including or excluding optional features. In this example, the processor is to generate downscaled candidates in a variety of shapes to be included with temporal inter motion estimation candidates.

Example 10 includes the system of any one of examples 1 to 9, including or excluding optional features. In this example, the processor is to control a one-dimensional search region to omit or include nearest reconstructed pixels.

Example 11 is a method for hardware video encoding. The method includes executing an intra block copy predictor search on pixels above a current block to generate top block copy (TBC) predictors. The method includes executing an integer motion estimation search around the TBC predictors. The method includes executing an intra block copy search left of the current block to generate intra-block-copy candidates. The method includes executing skip check, inter refinement, and intra search, using nested loops to generate residuals. The method includes executing a palette search to generate palette candidates and generate residuals for the palette candidates. The method also includes calculating a rate distortion optimization (RDO) cost for each of the generated residuals and executing a mode decision for transform unit sizes up to a size of a coding unit. The method includes comparing the RDO costs of the generated residuals to generate a largest coding unit (LCU) based on residuals with a lower RDO cost and executing a final mode decision.

Example 12 includes the method of example 11, including or excluding optional features. In this example, executing the palette search includes scanning a target block to detect frequent or new colors and using the frequent or new colors and previously identified colors to remap the target block into an index of the frequent or new colors.

Example 13 includes the method of any one of examples 11 to 12, including or excluding optional features. In this example, executing the palette search includes analyzing a target block using a hashtable with a hashkey derived from a programmable hash quantization of each color channel.

Example 14 includes the method of any one of examples 11 to 13, including or excluding optional features. In this example, executing the palette search includes categorizing candidate colors based on a distance from previously identified colors, an occurrence count, and an escape replacement.

Example 15 includes the method of any one of examples 11 to 14, including or excluding optional features. In this example, executing the palette search includes executing a partially delayed coding tree decision including determining whether each of a plurality of palette coding units is a final winner within a larger coding unit.

Example 16 includes the method of any one of examples 11 to 15, including or excluding optional features. In this example, executing the palette search includes executing a variable color distance selection.

Example 17 includes the method of any one of examples 11 to 16, including or excluding optional features. In this example, executing the palette search includes controlling binarization complexity based on maximum total runs and maximum total escape pixels.

Example 18 includes the method of any one of examples 11 to 17, including or excluding optional features. In this example, executing the intra block copy predictor search includes executing a two-dimensional search of a current picture, and generating a full-resolution candidate block vector or a down-scaled search center.

Example 19 includes the method of any one of examples 11 to 18, including or excluding optional features. In this example, executing the intra block copy predictor search includes generating downscaled candidates in a variety of shapes to be included with temporal inter motion estimation candidates.

Example 20 includes the method of any one of examples 11 to 19, including or excluding optional features. In this example, executing the intra block copy search includes controlling of a one-dimensional search region to omit or include nearest reconstructed pixels.

Example 21 is an apparatus for video encoding. The apparatus includes an encoder including a palette prediction unit to execute a multi-pass palette search and mapping on a video frame to generate palette candidates. The encoder includes a rate distortion optimization unit to calculate a rate distortion optimization (RDO) cost for a set of generated residuals, the palette candidates, and the intra-block-copy candidates. The apparatus also includes a hardware bit packing (PAK) unit to pack bits as coded according to a final mode decision based a comparison of the RDO costs into a data format.

Example 22 includes the apparatus of example 21, including or excluding optional features. In this example, the palette prediction unit is to scan a target block to detect frequent or new colors and use the frequent or new colors and previously identified colors to remap the target block into an index of the frequent or new colors.

Example 23 includes the apparatus of any one of examples 21 to 22, including or excluding optional features. In this example, the palette prediction unit is to analyze a target block using a hashtable with a hashkey derived from a programmable hash quantization of each color channel.

Example 24 includes the apparatus of any one of examples 21 to 23, including or excluding optional features. In this example, the palette prediction unit is to use a plurality of thresholds to categorize candidate colors based on a distance from previously identified colors, an occurrence count, and an escape replacement.

Example 25 includes the apparatus of any one of examples 21 to 24, including or excluding optional features. In this example, the palette prediction unit includes a multi-level candidate structure of potential new colors and a guard-banded selection of previously identified colors. The palette prediction unit is to also execute a partially delayed coding tree decision including determining whether each of a plurality of palette coding units is a final winner within a larger coding unit.

Example 26 includes the apparatus of any one of examples 21 to 25, including or excluding optional features. In this example, the palette prediction unit is to execute a variable color distance selection.

Example 27 includes the apparatus of any one of examples 21 to 26, including or excluding optional features. In this example, the palette prediction unit includes binarization complexity controls based on maximum total runs and maximum total escape pixels.

Example 28 includes the apparatus of any one of examples 21 to 27, including or excluding optional features. In this example, the intra block prediction unit is to execute a two-dimensional search of a current picture. The two-dimensional search is to generate a full-resolution candidate block vector or a down-scaled search center for further testing.

Example 29 includes the apparatus of any one of examples 21 to 28, including or excluding optional features. In this example, the intra block prediction unit is to generate downscaled candidates in a variety of shapes to be included with temporal inter motion estimation candidates.

Example 30 includes the apparatus of any one of examples 21 to 29, including or excluding optional features. In this example, the intra block prediction unit is to control a one-dimensional search region to omit or include nearest reconstructed pixels Example 31 is a system for video encoding. The system includes means for executing a multi-pass palette search and mapping on a video frame to generate palette candidates. The system includes means for executing an intra block copy prediction on the video frame to generate intra-block-copy candidates. The system includes means for executing a final mode decision based on a comparison of the rate distortion optimization (RDO) costs.

Example 32 includes the system of example 31, including or excluding optional features. In this example, the means for executing the multi-pass palette search and mapping is to scan a target block to detect frequent or unique colors with respect to previously identified colors and use a union of the frequent or unique colors and previously identified colors to remap the target block into an index of the frequent or unique colors.

Example 33 includes the system of any one of examples 31 to 32, including or excluding optional features. In this example, the system includes a hashtable. The means for executing the multi-pass palette search and mapping is to analyze a target block using the hashtable with a hashkey derived from a programmable hash quantization of each color channel.

Example 34 includes the system of any one of examples 31 to 33, including or excluding optional features. In this example, the means for executing the multi-pass palette search and mapping is to use a plurality of thresholds to categorize candidate colors based on a distance from previously identified colors, an occurrence count, and an escape replacement.

Example 35 includes the system of any one of examples 31 to 34, including or excluding optional features. In this example, the means for executing the multi-pass palette search and mapping includes a multi-level candidate structure of potential new colors and a guard-banded selection of previously identified colors. The means for executing the multi-pass palette search and mapping is to execute a partially delayed coding tree decision including determining whether each of a plurality of palette coding units is a final winner within a larger coding unit.

Example 36 includes the system of any one of examples 31 to 35, including or excluding optional features. In this example, the palette prediction unit is to execute a variable color distance selection.

Example 37 includes the system of any one of examples 31 to 36, including or excluding optional features. In this example, the palette prediction unit includes binarization complexity controls based on maximum total runs and maximum total escape pixels.

Example 38 includes the system of any one of examples 31 to 37, including or excluding optional features. In this example, the means for executing the intra block copy prediction is to execute a one-dimensional search and a two-dimensional search of a current picture. The one-dimensional search, the two-dimensional search, or both, is to generate a full-resolution candidate block vector or a down-scaled search center for further testing.

Example 39 includes the system of any one of examples 31 to 38, including or excluding optional features. In this example, the means for executing the intra block copy prediction is to generate downscaled candidates in a variety of shapes to be included with temporal inter motion estimation candidates.

Example 40 includes the system of any one of examples 31 to 39, including or excluding optional features. In this example, the means for executing the intra block copy prediction is to control a one-dimensional search region to omit or include nearest reconstructed pixels.

Example 41 is at least one computer readable medium for encoding video frames having instructions stored therein that direct the processor to execute a multi-pass palette search and mapping on a video frame to generate palette candidates. The computer-readable medium includes instructions that direct the processor to execute an intra block copy prediction on the video frame to generate intra-block-copy candidates. The computer-readable medium includes instructions that direct the processor to calculate a rate distortion optimization (RDO) cost for a set of generated residuals, the palette candidates, and the intra-block-copy candidates. The computer-readable medium includes instructions that direct the processor to execute a final mode decision based on a comparison of the rate distortion optimization (RDO) costs.

Example 42 includes the computer-readable medium of example 41, including or excluding optional features. In this example, the computer-readable medium includes instructions to scan a target block to detect frequent or unique colors with respect to previously identified colors and use a union of the frequent or unique colors and previously identified colors to remap the target block into an index of the frequent or unique colors.

Example 43 includes the computer-readable medium of any one of examples 41 to 42, including or excluding optional features. In this example, the computer-readable medium includes instructions to analyze a target block using a hashtable with a hashkey derived from a programmable hash quantization of each color channel.

Example 44 includes the computer-readable medium of any one of examples 41 to 43, including or excluding optional features. In this example, the computer-readable medium includes instructions to use a plurality of thresholds to categorize candidate colors based on a distance from previously identified colors, an occurrence count, and an escape replacement.

Example 45 includes the computer-readable medium of any one of examples 41 to 44, including or excluding optional features. In this example, the computer-readable medium includes instructions to execute a partially delayed coding tree decision including determining whether each of a plurality of palette coding units is a final winner within a larger coding unit.

Example 46 includes the computer-readable medium of any one of examples 41 to 45, including or excluding optional features. In this example, the computer-readable medium includes instructions to execute a variable color distance selection.

Example 47 includes the computer-readable medium of any one of examples 41 to 46, including or excluding optional features. In this example, the computer-readable medium includes instructions to control binarization complexity based on maximum total runs and maximum total escape pixels.

Example 48 includes the computer-readable medium of any one of examples 41 to 47, including or excluding optional features. In this example, the computer-readable medium includes instructions to execute a one-dimensional search and a two-dimensional search of a current picture. The one-dimensional search, the two-dimensional search, or both, is to generate a full-resolution candidate block vector or a down-scaled search center for further testing.

Example 49 includes the computer-readable medium of any one of examples 41 to 48, including or excluding optional features. In this example, the computer-readable medium includes instructions to generate downscaled candidates in a variety of shapes to be included with temporal inter motion estimation candidates.

Example 50 includes the computer-readable medium of any one of examples 41 to 49, including or excluding optional features. In this example, the computer-readable medium includes instructions to control a one-dimensional search region to omit or include nearest reconstructed pixels.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for video encoding, the system comprising:
memory; and
at least one processor to execute computer readable instructions to:
execute a multi-pass palette prediction on a video frame to generate one or more palette candidates, the multi-pass palette prediction including:
a first pass to determine valid colors for a target block of the video frame based on a hashtable and a predictor palette, the hashtable including entries indexed by hashkeys determined from color channel values of pixels of the target block, a first one of the entries of the hashtable including a count of a number of pixels of the target block having respective color channel values that hash to a first one of the hashkeys that indexes the first one of the entries; and
a second pass to map the pixels of the target block to ones of the valid colors to determine a first one of the one or more palette candidates;
execute an intra block copy prediction on the video frame to generate one or more intra-block-copy candidates;
calculate a rate distortion optimization (RDO) cost for a set of generated residuals, the one or more palette candidates, and the one or more intra-block-copy candidates; and
execute a final mode decision based on a comparison of the RDO costs.

2. The system of claim 1, wherein the processor is to scan the target block to populate the hashtable.

3. The system of claim 1, wherein the processor is to determine the hashkeys based on a programmable hash quantization of each color channel of the pixels of the target block.

4. The system of claim 1, wherein the processor is to categorize candidate colors based on a distance from previously identified colors, an occurrence count, and an escape replacement.

5. The system of claim 1, wherein the processor is to:
implement a candidate structure of potential new colors and a guard-banded selection of previously identified colors; and
execute a coding tree decision to determine whether each of a plurality of palette coding units is a winner within a larger coding unit.

6. The system of claim 1, wherein the processor is to execute a variable color distance selection.

7. The system of claim 1, wherein the processor is to control binarization complexity based on maximum total runs and maximum total escape pixels.

8. The system of claim 1, wherein the processor is to execute a one-dimensional search and a two-dimensional search of a current picture, wherein the one-dimensional search, the two-dimensional search, or both, is to generate a full-resolution candidate block vector or a down-scaled search center for further testing.

9. The system of claim 1, wherein the processor is to generate downscaled candidates in a variety of shapes to be included with temporal inter motion estimation candidates.

10. The system of claim 1, wherein the processor is to control a one-dimensional search region to omit or include nearest reconstructed pixels.

11. The system of claim 1, the first one of the entries of the hashtable further includes (i) a first color value corresponding to the color channel values that hash to the first one of the hashkeys that index the first one of the entries, and (iii) a first distance computed between the first color value and a second color value of a predictor palette.

12. The system of claim 11, wherein the second color value is a color value of the predictor palette that is nearest to the first color value.

13. An apparatus for video encoding, the apparatus comprising:
an encoder including:
a palette prediction unit to execute a multi-pass palette prediction on a video frame to generate one or more palette candidates, the multi-pass palette prediction including:
a first pass to determine valid colors for a target block of the video frame based on a hashtable and a predictor palette, the hashtable including entries indexed by hashkeys determined from color channel values of pixels of the target block, a first one of the entries of the hashtable including a count of a number of pixels of the target block having respective color channel values that hash to a first one of the hashkeys that indexes the first one of the entries; and
a second pass to map the pixels of the target block to ones of the valid colors to determine a first one of the one or more palette candidates;
an intra block prediction unit to execute an intra block copy prediction on the video frame to generate one or more intra-block-copy candidates; and
a rate distortion optimization unit to calculate a rate distortion optimization (RDO) cost for a set of generated residuals, the one or more palette candidates, and the one or more intra-block-copy candidates; and
a hardware bit packing (PAK) unit to pack bits as coded according to a final mode decision based a comparison of the RDO costs into a data format.

14. The apparatus of claim 13, wherein the palette prediction unit is to scan the target block to populate the hashtable.

15. The apparatus of claim 13, wherein the palette prediction unit is to determine the hashkeys based on a programmable hash quantization of each color channel of the pixels of the target block.

16. The apparatus of claim 13, wherein the intra block prediction unit is to generate downscaled candidates in a variety of shapes to be included with temporal inter motion estimation candidates.

17. The apparatus of claim 13, wherein the intra block prediction unit is to control a one-dimensional search region to omit or include nearest reconstructed pixels.

18. The apparatus of claim 13, wherein the first one of the entries of the hashtable further includes (i) a first color value corresponding to the color channel values that hash to the first one of the hashkeys that index the first one of the entries, and (iii) a first distance computed between the first color value and a second color value of the predictor palette.

19. The apparatus of claim 18, wherein the second color value is a color value of the predictor palette that is nearest to the first color value.

20. A method for hardware video encoding comprising:
executing an intra block copy predictor search on pixels above a current block to generate top block copy (TBC) predictors;
executing an integer motion estimation search around the TBC predictors;

executing an intra block copy search left of the current block to generate intra-block-copy candidates;

executing skip check, inter refinement, and intra search, using nested loops to generate residuals;

executing a multi-pass palette prediction to generate one or more palette candidates, the executing of the multi-pass palette prediction including:

performing a first pass to determine valid colors for a target block of a video frame based on a hashtable and a predictor palette, the hashtable including entries indexed by hashkeys determined from color channel values of pixels of the target block, a first one of the entries of the hashtable including a count of a number of pixels of the target block having respective color channel values that hash to a first one of the hashkeys that indexes the first one of the entries; and performing a second pass to map the pixels of the target block to ones of the valid colors to determine a first one of the one or more palette candidates;

generating residuals for the one or more palette candidates;

calculating a rate distortion optimization (RDO) cost for each of the generated residuals, and executing a mode decision for transform unit sizes up to a size of a coding unit; and comparing the RDO costs of the generated residuals to generate a largest coding unit (LCU), and executing a final mode decision.

21. The method of claim 20, wherein the executing of the intra block copy predictor search includes executing a two-dimensional search of a current picture, and generating a full-resolution candidate block vector or a down-scaled search center.

22. The method of claim 20, wherein the executing of the intra block copy predictor search includes generating down-scaled candidates in a variety of shapes to be included with temporal inter motion estimation candidates.

23. The method of claim 20, wherein the executing of the intra block copy search includes controlling of a one-dimensional search region to omit or include nearest reconstructed pixels.

* * * * *